United States Patent
Kambe

(10) Patent No.: US 6,928,212 B2
(45) Date of Patent: Aug. 9, 2005

(54) WAVEGUIDE-TYPE OPTICAL CONTROL DEVICE AND PROCESS FOR PRODUCING THE SAME

(75) Inventor: Toshiyuki Kambe, Tokyo (JP)

(73) Assignee: NEC Corporation, Tokyo (JP)

(*) Notice: Subject to any disclaimer, the term of this patent is extended or adjusted under 35 U.S.C. 154(b) by 30 days.

(21) Appl. No.: 10/737,802

(22) Filed: Dec. 18, 2003

(65) Prior Publication Data

US 2005/0013545 A1 Jan. 20, 2005

Related U.S. Application Data

(62) Division of application No. 10/025,776, filed on Dec. 26, 2001, now Pat. No. 6,714,706.

(30) Foreign Application Priority Data

Dec. 22, 2000 (JP) ........................................ 2000-391385
Mar. 21, 2001 (JP) ........................................ 2001-081183

(51) Int. Cl.[7] .............................................. G02B 6/26
(52) U.S. Cl. .............................. 385/27; 385/40; 385/39
(58) Field of Search .......................... 385/1–4, 10, 13, 385/14, 39–44, 45

(56) References Cited

U.S. PATENT DOCUMENTS

| | | | |
|---|---|---|---|
| 4,142,775 A | 3/1979 | Ramaswamy et al. | |
| 4,390,236 A | 6/1983 | Alferness | |
| 4,917,449 A | 4/1990 | Granestrand | |
| 5,111,517 A | 5/1992 | Riviere | |
| 5,146,518 A | 9/1992 | Mak et al. | |
| 5,249,243 A * | 9/1993 | Skeie ............................. | 385/3 |
| 6,535,653 B1 | 3/2003 | Hung et al. | |
| 6,567,599 B2 | 5/2003 | Hung | |
| 6,714,706 B2 * | 3/2004 | Kambe ......................... | 385/41 |
| 2002/0025103 A1 | 2/2002 | Thaniyavam | |
| 2002/0085811 A1 * | 7/2002 | Kambe ......................... | 385/41 |
| 2002/0118902 A1 * | 8/2002 | Kambe ......................... | 385/2 |
| 2002/0131745 A1 | 9/2002 | Azarbar | |
| 2003/0012483 A1 * | 1/2003 | Ticknor et al. ............... | 385/16 |
| 2003/0039461 A1 * | 2/2003 | How Kee Chun et al. . | 385/140 |
| 2003/0128905 A1 * | 7/2003 | Kambe et al. ................ | 385/3 |

* cited by examiner

Primary Examiner—Akm Enayet Ullah
(74) Attorney, Agent, or Firm—Young & Thompson

(57) ABSTRACT

Two right and left optical waveguides are provided so as to pass through a first directional coupler, a phase shifter, and a second directional coupler and so that directional couplers are provided in the first directional coupler portion and the second directional coupler portion. A third electrode is provided between these optical waveguides. A first electrode is provided on the left side of the left optical waveguide, and a second electrode is provided on the right side of the right optical waveguide. These electrodes are extended into the first directional coupler. Upon the application of a bias voltage, the voltage is simultaneously applied to all the first to third electrodes. By virtue of this construction, a waveguide-type optical control device can be realized which, in a directional coupler-type Mach-Zehnder (MZ) construction, can improve the extinction ratio without the complication of the construction.

7 Claims, 28 Drawing Sheets

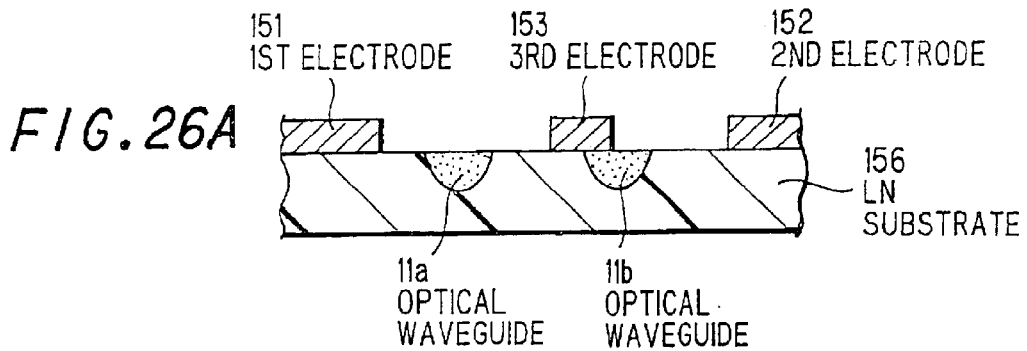
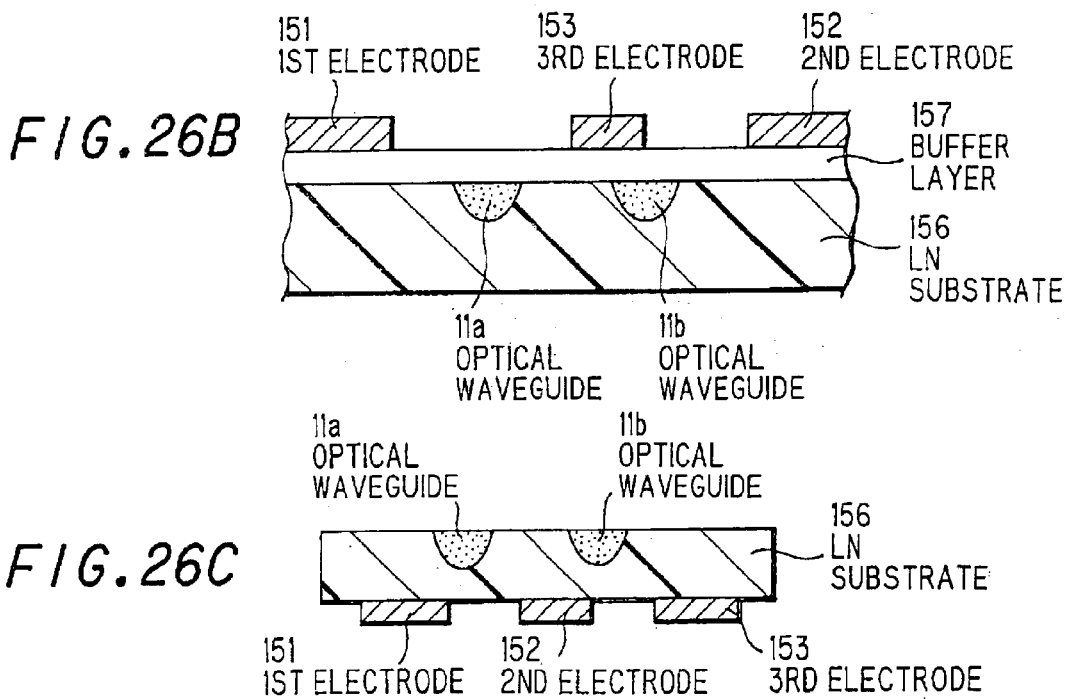
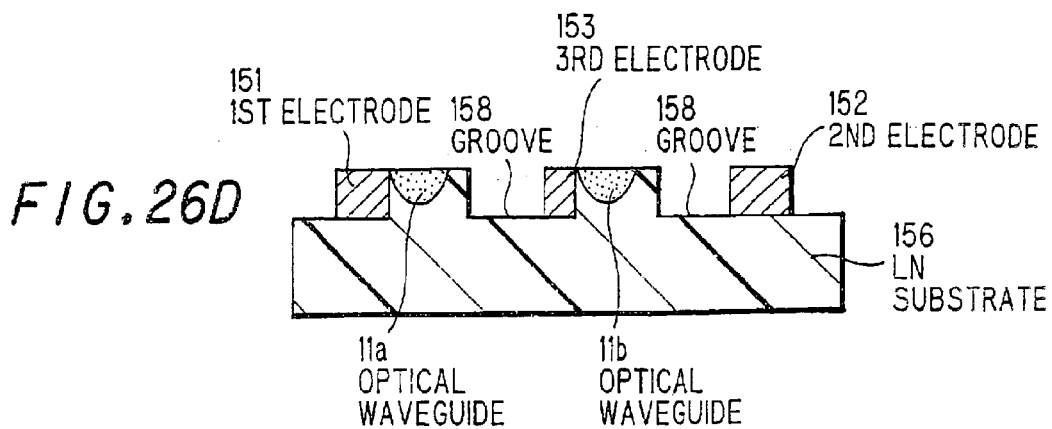

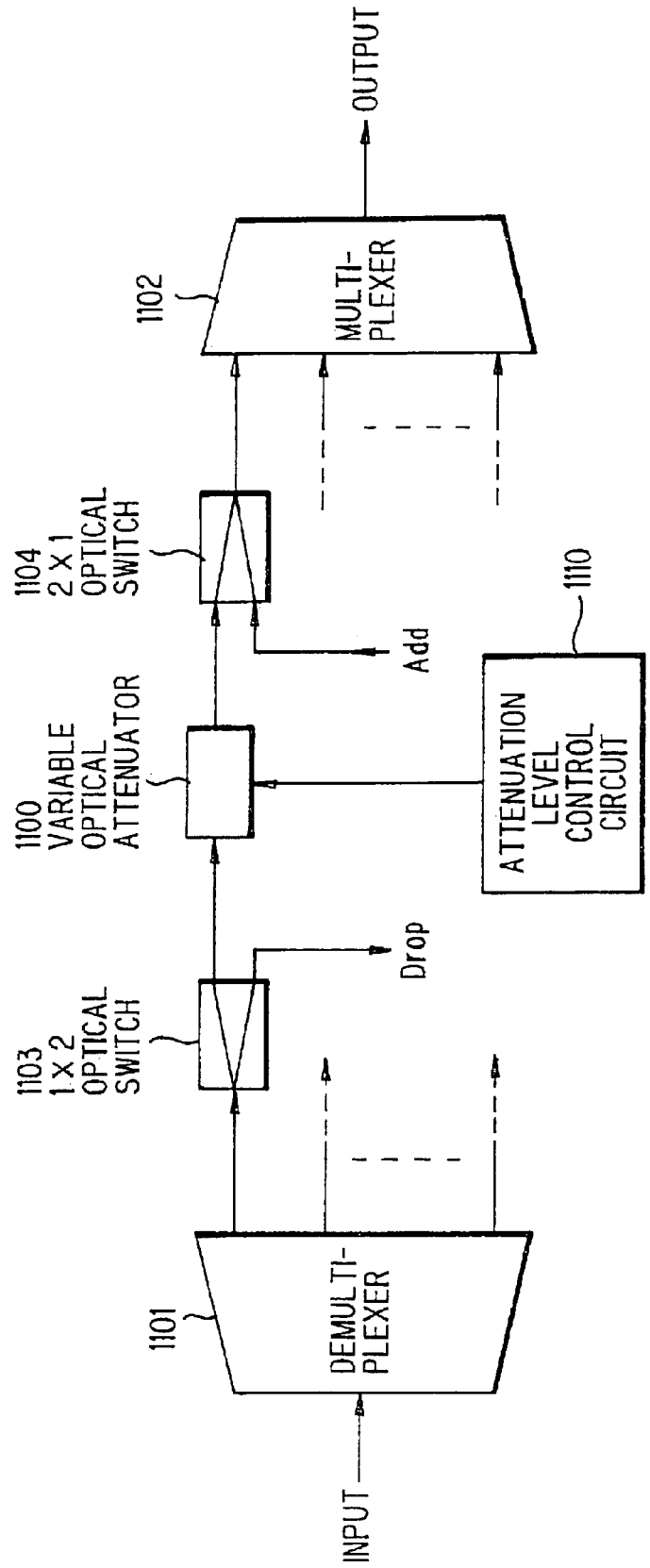

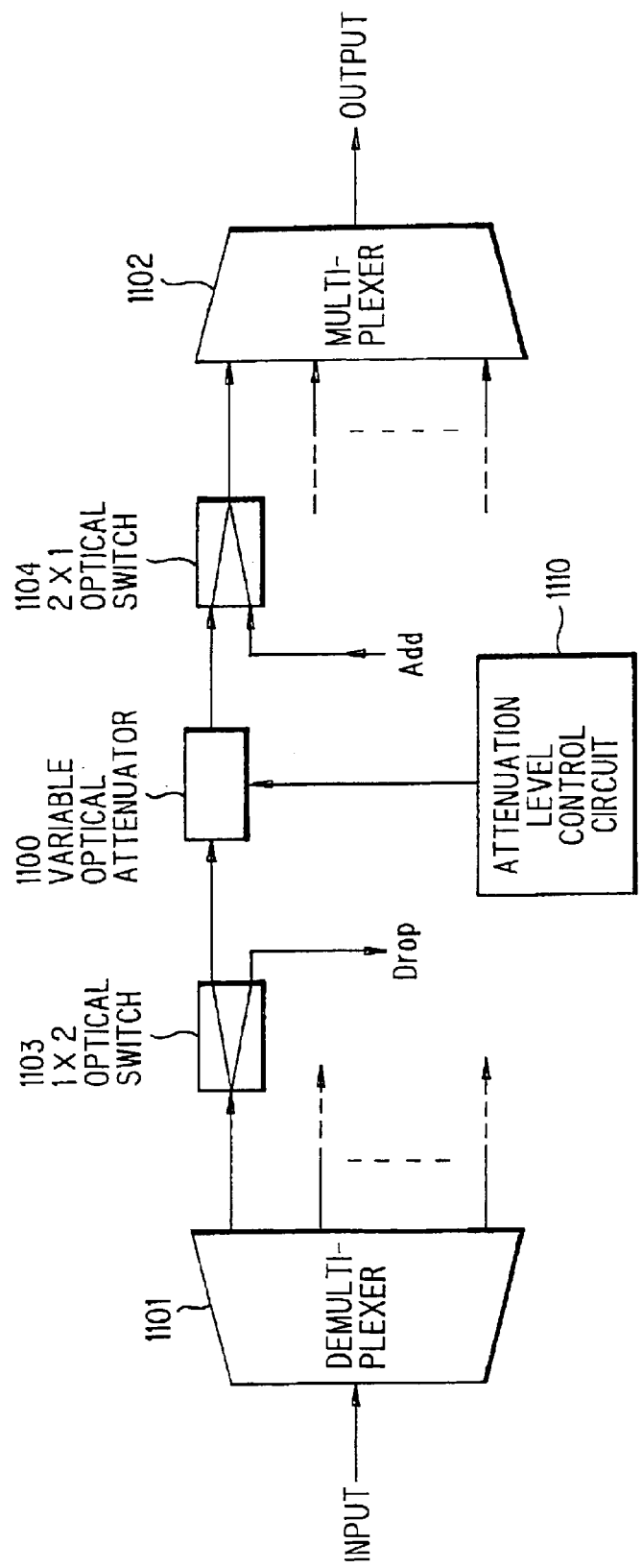

WAVEGUIDE-TYPE OPTICAL CONTROL DEVICE AND PROCESS FOR PRODUCING THE SAME

CROSS REFERENCE TO RELATED APPLICATIONS

This application is a division of application Ser. No. 10/025,776, filed on Dec. 26, 2001 now U.S. Pat. No. 6,714,706 the entire contents of which are hereby incorporated by reference.

FIELD OF THE INVENTION

The invention relates to a waveguide-type optical control device and a process for producing the same, and more particularly to a waveguide-type optical control device, which has a directional coupler-type Mach-Zehnder construction and can improve the ratio of the minimum attenuation level to the maximum attenuation level (extinction ratio) without complicating the construction, and a process for producing the same.

BACKGROUND OF THE INVENTION

Waveguide-type optical control devices are suitable for integration and a reduction in power consumption, and, thus, studies have been made on the utilization of waveguide-type optical control devices in optical switches or optical modulators. Further, in recent years, the spread of dense wavelength division multiplexing (DWDM) has lead to an increasing demand for variable optical attenuators as means for making optical powers of respective wavelengths uniform at the time of wavelength multiplexing, or as optical parts of optical ADMs (add drop multiplexers) which select a desired wavelength and inserts/removes the wavelength in a transmission line. Among others, variable optical attenuators having a directional coupler-type Mach-Zehnder (MZ) construction comprising two directional couplers provided on an $LiNbO_3$ (lithium niobate; LN) substrate, which is advantageous from the viewpoints of a reduction in size, a reduction in voltage, and a reduction in power consumption, and a phase shifter provided between the two directional couplers are being put to practical use.

FIG. 1 shows the construction of a conventional waveguide-type optical control device having a directional coupler-type Mach-Zehnder construction. In FIG. 1, a variable optical attenuator is exemplified as the waveguide-type optical control device.

The variable optical attenuator having a directional coupler-type Mach-Zehnder construction comprises: optical waveguides $1a$, $1b$ which are provided parallel to each other on an LN substrate (not shown); a first directional coupler 2 provided within the optical waveguides $1a$, $1b$; a phase shifter 3 provided adjacent to the first directional coupler 2; and a second directional coupler 4 provided adjacent to the phase shifter 3. The phase shifter 3 comprises a first electrode $3a$, a second electrode $3b$, and a third electrode $3c$. The third electrode $3c$ is used as a common electrode. A negative (−) voltage is applied to this electrode from a direct current power supply $3d$, and a positive (+) voltage is applied to the first electrode $3a$ and the second electrode $3b$ from the direct current power supply $3d$ to cause an electric field.

Next, the operation of the waveguide-type optical control device (variable optical attenuator) shown in FIG. 1 will be explained. A signal light introduced from the end of the optical waveguide $1a$ is branched in the first directional coupler 2 into signal light parts which are to be traveled respectively through optical waveguides $1a$ and $1b$ (branching ratio=50:50), and the branched signal lights are then input into the phase shifter 3. The phase shifter 3 operates according to the magnitude of an applied voltage 31 from the direct current power supply $3d$. When the voltage 31 is not applied from the direct current power supply $3d$, the branched signal lights introduced into the optical waveguides $1a$ and $1b$ are input in an identical phase into the second directional coupler 4 and the whole light is output from the output terminal of the optical waveguide $1b$ while no light is output from the optical waveguide $1a$.

Next, when the applied voltage 31 is increased from 0 (zero) volt, the refractive index of the optical waveguides $1a$ and $1b$ are changed and, consequently, the propagation speed of signal lights, which travel respectively through the optical waveguides $1a$ and $1b$, is changed. Since the voltage applied to the optical waveguide $1a$ is opposite in direction to the voltage applied to the optical waveguide $1b$, a difference occurs in propagation speed between signal light, which travels through the optical waveguide $1a$, and signal light which travels through the optical waveguide $1b$ in the phase shifter 3. As a result, the signal light in the optical waveguide $1a$ and the signal light in the optical waveguide $1b$ are input in a mutually different phase into the second directional coupler 4. For this reason, the branching ratio (coupling rate) of the second directional coupler 4 is deviated from the original rate 50%, and, as a result, a part of signal light, which, up to this stage, has been entirely output from the optical waveguide $1b$ in the second directional coupler 4, is also output from the optical waveguide $1a$. When the applied voltage 31 is increased to about 30 to 50 V, the signal light is substantially entirely output from the optical waveguide $1a$. That is, setting the applied voltage 31 to a suitable value permits the coupling length L in the phase shifter 3 to be equivalently changed and, consequently, permits optical output corresponding to the change to be obtained.

When the voltage 31 was not applied, or when a voltage of about 30 to 50 V was applied, in order to output the whole signal light from any one of the optical waveguide $1a$ and the optical waveguide $1b$ in the second directional coupler 4, the branching ratio (coupling rate) of the first directional coupler 2 to the second directional coupler 4 should be accurately brought to 50:50 (50%). To this end, the length of a portion where the optical waveguides $1a$ and $1b$ approach each other (coupling length $L=\pi/2\gamma$ wherein $\gamma$ represents Pockels constant) should be accurately brought to the half of the complete coupling length Lc ($=\pi/2\kappa$ wherein $\kappa$ represents coupling coefficient). The deviation of the branching ratio (coupling rate) of the first directional coupler 2 to the second directional coupler 4 from 50:50 (50%) results in increased leakage of the light signal from one waveguide to the other waveguide at the output terminal of the second directional coupler 4 and thus deteriorates the ratio of the minimum attenuation level to the maximum attenuation level (extinction ratio).

FIG. 2 shows the relationship between the gap and the coupling length in a directional coupler.

The length of a portion, where the optical waveguides $1a$ and $1b$ approaches and are coupled to each other (coupling length L), and a gap G are important to the directional coupler. In order to bring the branching ratio (coupling rate) to 50:50 (50%), it is necessary to eliminate a variation in the gap G and to bring the coupling length L to [complete coupling length Lc÷2] These two are important parameters for a production process of the directional coupler.

FIG. 3 shows that characteristics vary according to the production parameters. When there is no variation in gap G shown in FIG. 2 and, at the same time, when the coupling length L is equal to the half of the complete coupling length Lc, ideal characteristics 130 are obtained, that is, the crosstalk is minimized and, consequently, the extinction ratio is increased. On the other hand, when there is a variation in gap G or when the coupling length L is not equal to the half of the complete coupling length Lc, deteriorated characteristics 131 are obtained. It is known that a change in coupling rate only by several percents from 50% causes this state.

In order to solve this problem, Japanese Patent Publication No. 72964/1994 proposes a construction such that, separately from electrodes for the phase shifter, electrodes for directional couplers are provided in the directional couplers in the optical waveguides to control the refractive index in the optical waveguides, thereby equivalently regulating the coupling length L. This construction will be explained in conjunction with FIG. 4.

FIG. 4 shows another conventional waveguide-type optical control device. Also in FIG. 4, a variable optical attenuator is used as the waveguide-type optical control device.

A first directional coupler 2, a phase shifter 3, and a second directional coupler 4 are disposed in series between the input terminal and the output terminal of the optical waveguides 1a and 1b. For applying a bias voltage, electrodes 20a, 20b are provided in the first directional coupler 2, electrodes 30a, 30b are provided in the phase shifter 3, and electrodes 40a, 40b are provided in the second directional coupler 4. The refractive index in the first and second directional couplers 2, 4 are controlled by properly setting the voltage applied to the electrodes 20a, 20b and the electrodes 40a, 40b. As a result, the coupling length L is equivalently regulated, and a deterioration in extinction ratio is improved.

Further, Japanese Patent Laid-Open No. 142569/1998 proposes a directional coupler having a construction which can reduce the level of leakage between optical waveguides and can improve dynamic range. Specifically, this publication proposes a construction which brings the coupling length L in the directional coupler to a double length of the complete coupling length Lc or a length obtained by multiplying the complete coupling length Lc by an even number.

The conventional waveguide-type optical control devices, however, have the following problems. In the construction proposed in Japanese Patent Publication No. 72964/1994 wherein dedicated electrodes are independently provided for the phase shifter and the two directional couplers, the device size of the variable optical attenuator is disadvantageously increased. Further, since the electrodes are disposed in three blocks, the number of sites where voltage control should be performed is increased. This disadvantageously complicates the construction of the control circuit.

On the other hand, according to the construction proposed in Japanese Patent Laid-Open No. 142569/1998, the coupling length L is at least twice of the complete coupling length Lc. That is, the total length of the device is long, and, thus, it is impossible to reduce the size of the device.

SUMMARY OF THE INVENTION

Accordingly, it is an object of the invention to provide a waveguide-type optical control device, which can improve the extinction ratio and the dynamic range without the complication of the construction and can realize a reduction in size, and a process for producing the waveguide-type optical control device.

According to the first feature of the invention, a waveguide-type optical control device comprises:

first and second directional couplers provided while leaving a predetermined spacing therebetween, said first and second directional couplers being constituted respectively by two right and left optical waveguides provided on a substrate; and a phase shifter provided between the first directional coupler and the second directional coupler, first, second, and third electrodes being provided respectively on the left side of the left optical waveguide, on the right side of the right optical waveguide, and between the two optical waveguides, said phase shifter functioning to control light, which passes through the two optical waveguides, according to a voltage applied to the first, second, and third electrodes;

said first, second, and third electrodes being extended into the first and second directional couplers.

According to this construction, the first, second, and third electrodes are extended from the phase shifter into the first and second directional couplers, and, thus, the voltage applied to the phase shifter as such is also applied to the first and second directional couplers to control the refractive index of the first and second directional couplers. By virtue of this, since the coupling length is equivalently regulated, a deterioration in extinction ratio can be suppressed. Further, since the number of electrodes in the directional coupler is identical to that in the phase shifter, there is no need to increase the size of the device, and, in addition, the complication of the control system can be avoided.

According to the second feature of the invention, a waveguide-type optical control device comprises:

a phase shifter provided with a first electrode section comprising an electrode provided on the left side of a left optical waveguide, an electrode provided on the right side of a right optical waveguide, and an electrode provided between the two optical waveguides; and a directional coupler comprising two optical waveguides which are connected respectively to the two right and left optical waveguides in the phase shifter and are provided parallel to each other with the spacing between the two optical waveguides being partially reduced, said directional coupler being used in at least one of an optical branching section provided on the input side of the phase shifter and an optical coupling section provided on the output side of the phase shifter, the refractive index of the two optical waveguides being varied according to a voltage applied across the electrodes provided respectively on the left side of the left optical waveguide and the right side of the right optical waveguide and the electrode provided between the two optical waveguides in the phase shifter;

said directional coupler being provided with a second electrode section comprising an electrode provided on the left side of the left optical waveguide, an electrode provided on the right side of the right optical waveguide, and an electrode provided between the two optical waveguides, the three electrodes constituting the second electrode section being electrically connected respectively to the three electrodes constituting the first electrode section provided adjacent to the second electrode section in the longitudinal direction of the two optical waveguides, the voltage applied to the first electrode section being applied to the second electrode section.

According to this construction, the directional coupler used in the optical branching section or the optical coupling section comprises, in its coupling portion, a second electrode section having three electrodes, i.e., a first electrode provided on the left side of the left optical waveguide, a second electrode provided on the right side of the right optical waveguide, and a third electrode provided between the two optical waveguides, and the electrodes in this second electrode section are separately and electrically connected respectively to three electrodes of the first electrode section in the phase shifter, whereby the voltage applied to the first electrode section in the phase shifter is simultaneously applied to the electrodes of the second electrode section in the directional coupler. By virtue of this construction, the refractive index in the directional coupler is controlled by the voltage applied to the phase shifter. As a result, the coupling length L is equivalently regulated to suppress the deterioration in extinction ratio. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the third feature of the invention, a waveguide-type optical control device comprises:
- a phase shifter comprising two left and right optical waveguides, a first electrode provided on the left side of the left optical waveguide, a second electrode provided on the right side of the right optical waveguide, and a third electrode provided between the two optical waveguides;
- a first directional coupler that is connected to one end of the phase shifter and functions to branch an optical signal introduced through one of the two optical waveguides into optical signal parts which are then introduced respectively into the two optical waveguides; and
- a second directional coupler that is connected to the other end of the phase shifter and functions to couple the optical signal parts received respectively from the two optical waveguides;
- at least one of the first and second electrodes and the third electrode having been extended into a part or the whole of the first directional coupler or the second directional coupler.

According to this construction, the first, second, and third electrodes in the phase shifter are extended into a part or the whole of the first directional coupler or the second directional coupler using common optical waveguides. Therefore, upon the application of the voltage across the electrodes in the phase shifter, an electric field is applied to the phase shifter and, at that same time, is also applied to the first or second directional coupler, whereby the refractive index in the directional coupler is also controlled. As a result, since the coupling length L is equivalently regulated, the deterioration in extinction ratio can be suppressed. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the fourth feature of the invention, a waveguide-type optical control device comprising:
- a phase shifter comprising two left and right optical waveguides, a first electrode provided on the left side of the left optical waveguide, a second electrode provided on the right side of the right optical waveguide, and a third electrode provided between the two optical waveguides;
- a first directional coupler that is connected to one end of the phase shifter and functions to branch an optical signal introduced through one of the two optical waveguides into optical signal parts which are then introduced respectively into the two optical waveguides; and
- a second directional coupler that is connected to the other end of the phase shifter and functions to couple the optical signal parts received respectively from the two optical waveguides;
- at least one of the first and second electrodes and the third electrode having been extended into a part or the whole of the first directional coupler, at least one of the first and second electrodes and the third electrode having been extended into a part or the whole of the second directional coupler.

According to this construction, in addition to the third feature of the invention, the first, second, and third electrodes in the phase shifter are extended into a part or the whole of both the first directional coupler and the second directional coupler. Therefore, upon the application of the voltage to the electrodes in the phase shifter, an electric field is applied to the phase shifter and, at the same time, is also applied to the first and second directional couplers from the electrode portion provided in the first and second directional couplers, whereby the refractive index in each of the directional couplers is controlled. As a result, since the coupling length L is equivalently regulated, the deterioration in extinction ratio can be suppressed. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the fifth feature of the invention, a waveguide-type optical control device comprising:
- a phase shifter comprising two left and right optical waveguides, a first electrode provided on the left side of the left optical waveguide, a second electrode provided on the right side of the right optical waveguide, and a third electrode provided between the two optical waveguides;
- a first directional coupler that is connected to one end of the phase shifter and functions to branch an optical signal introduced through one of the two optical waveguides into optical signal parts which are then introduced respectively into the two optical waveguides; and
- a second directional coupler that is connected to the other end of the phase shifter and functions to couple the optical signal parts received respectively from the two optical waveguides;
- said first directional coupler comprising, in its directional coupling section, first directional coupling section outer electrodes disposed respectively at a portion near the left side of the left optical waveguide and at a portion near the right side of the right optical waveguide in the first directional coupling section and a first directional coupling section intermediate electrode disposed between the two optical waveguides in the first directional coupling section;
- said first electrode and said second electrode having been electrically connected respectively to the first directional coupling section outer electrodes, said third electrode having been electrically connected to the first directional coupling section intermediate electrode.

According to this construction, the first directional coupler using optical waveguides common to the first directional coupler and the phase shifter comprises first directional coupling section outer electrodes disposed respectively at a portion near the left side of the left optical waveguide and at a portion near the right side of the right optical waveguide in the first directional coupling section and a first directional coupling section intermediate electrode disposed between the two optical waveguides in the first directional coupling section, and the first, second, and third electrodes in the phase shifter are electrically connected respectively thereto. Therefore, upon the application of the voltage across the electrodes in the phase shifter, an electric field is applied to the phase shifter and, at the same time, is also applied to the first directional coupler, whereby the refractive index in the directional coupler is controlled. As a result, since the coupling length L is equivalently regulated, the deterioration in extinction ratio can be suppressed. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the sixth feature of the invention, a waveguide-type optical control device comprises:

a phase shifter comprising two left and right optical waveguides, a first electrode provided on the left side of the left optical waveguide, a second electrode provided on the right side of the right optical waveguide, and a third electrode provided between the two optical waveguides;

a first directional coupler that is connected to one end of the phase shifter and functions to branch an optical signal introduced through one of the two optical waveguides into optical signal parts which are then introduced respectively into the two optical waveguides; and a second directional coupler that is connected to the other end of the phase shifter and functions to couple the optical signal parts received respectively from the two optical waveguides;

said second directional coupler comprising, in its directional coupling section, second directional coupling section outer electrodes disposed respectively at a portion near the left side of the left optical waveguide and at a portion near the right side of the right optical waveguide in the second directional coupling section and a second directional coupling section intermediate electrode disposed between the two optical waveguides in the second directional coupling section;

said first electrode and said second electrode having been electrically connected respectively to the second directional coupling section outer electrodes, said third electrode having been electrically connected to the second directional coupling section intermediate electrode.

According to this construction, the second directional coupler using optical waveguides common to the second directional coupler and the phase shifter comprises second directional coupling section outer electrodes disposed respectively at a portion near the left side of the left optical waveguide and at a portion near the right side of the right optical waveguide in the second directional coupling section and a second directional coupling section intermediate electrode disposed between the two optical waveguides in the second directional coupling section, and the first, second, and third electrodes in the phase shifter are electrically connected respectively thereto. Therefore, upon the application of the voltage across the electrodes in the phase shifter, an electric field is applied to the phase shifter and, at the same time, is also applied to the second directional coupler, whereby the refractive index in the directional coupler is controlled. As a result, since the coupling length L is equivalently regulated, the deterioration in extinction ratio can be suppressed. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the seventh feature of the invention, a variable optical attenuator comprises:

a phase shifter provided with a first electrode section comprising an electrode provided on the left side of a left optical waveguide, an electrode provided on the right side of a right optical waveguide, and an electrode provided between the two optical waveguides; and a directional coupler comprising two optical waveguides which are connected respectively to the two optical waveguides in the phase shifter and are provided parallel to each other with the spacing between the two optical waveguides being partially reduced, said directional coupler being used in at least one of an optical branching section provided on the input side of the phase shifter and an optical coupling section provided on the output side of the phase shifter, the refractive index of the two optical waveguides being varied according to a voltage applied across the electrodes provided respectively on the left side of the left optical waveguide and the right side of the right optical waveguide and the electrode provided between the two optical waveguides in the phase shifter, whereby the attenuation level of the lights passed through the optical waveguides is controlled;

said directional coupler being provided with a second electrode section comprising an electrode provided on the left side of the left optical waveguide, an electrode provided on the right side of the right optical waveguide, and an electrode provided between the two optical waveguides, the three electrodes constituting the second electrode section being electrically connected respectively to the three electrodes constituting the first electrode section provided adjacent to the second electrode section in the longitudinal direction of the two optical waveguides, the voltage applied to the first electrode section being applied to the second electrode section.

According to this construction, the directional coupler used in the optical branching section or the optical coupling section comprises, in its region, a second electrode section having three electrodes, i.e., a first electrode provided on the left side of the left optical waveguide, a second electrode provided on the right side of the right optical waveguide, and a third electrode provided between the two optical waveguides, and the electrodes in this second electrode section are separately and electrically connected respectively to three electrodes in the first electrode section in the phase shifter, whereby the voltage applied to the first electrode section in the phase shifter is simultaneously applied to the electrodes of the second electrode section in the directional coupler. By virtue of this construction, the refractive index in the directional coupler is controlled by the voltage applied to the phase shifter to control the attenuation level of the optical signals which pass through the optical waveguides. Further, since insulation between the electrodes in the phase shifter and the electrodes in the directional coupler is not required, there is no need to provide a space between these electrodes. This can eliminate the need to increase the size of the variable optical attenuator, and, in addition, the complication of the control system (attenuation level control circuit) can be avoided.

According to the eighth feature of the invention, an optical equalizer comprises:

an optical demultiplexer into which a wavelength multiplexed optical signal containing a plurality of optical signals with one or mutually different wavelengths is input and which demultiplexes the wavelength multiplexed optical signal into optical signals and outputs the demultiplexed optical signals;

the variable optical attenuator according to the seventh feature of the invention which selectively attenuates the demultiplexed optical signals by a predetermined attenuation level and outputs the attenuated optical signals; and an optical multiplexer for multiplexing the attenuated optical signals output from the variable optical attenuator.

According to this construction, the optical equalizer comprises an optical demultiplexer for demultiplexing the input wavelength multiplexed optical signal, a variable optical attenuator for attenuating, to a predetermined level, the optical signals output from the optical demultiplexer, and an optical multiplexer for multiplexing optical signals from each variable optical attenuator. As described above in connection with the seventh feature of the invention, in the variable optical attenuator, the electrodes provided in the phase shifter separately and electrically connected to adjacent electrodes in the directional coupler. Therefore, upon the application of the voltage to the phase shifter, an electric field can be also applied to the directional coupler to control the attenuation level of the optical signals which pass through the optical waveguides. This can realize matching of optical signal levels. Thus, since insulation between the electrodes in the phase shifter and the electrodes in the directional coupler is not required, there is no need to provide a space between these electrodes. Further, since a common applied voltage can be used, the size of the variable optical attenuator can be reduced, and the necessity of increasing the size of the optical equalizer can be avoided.

According to the ninth feature of the invention, an optical inserting/separating apparatus comprises:

an optical demultiplexer into which a wavelength multiplexed optical signal containing a plurality of optical signals with one or mutually different wavelengths is input and which demultiplexes the wavelength multiplexed optical signal into optical signals and outputs the demultiplexed optical signals;

a wavelength varying filter for selectively separating an optical signal with a predetermined wavelength from the demultiplexed optical signals;

the variable optical attenuator according to the seventh feature of the invention which selectively attenuates the demultiplexed optical signals, which have passed through the wavelength varying filter, by a predetermined attenuation level and outputs the attenuated optical signals; and a filter which selects and outputs the attenuated optical signals from the variable optical attenuator or externally inserted optical signals; and an optical multiplexer for multiplexing the attenuated optical signals output from the filter or the inserted optical signals.

According to this construction, optical signals with predetermined wavelengths are selectively separated from the optical signals, which have been demultiplexed by the optical demultiplexer, through a wavelength varying filter, and the level of the optical signals, which have been passed through the filter, is then attenuated to a desired level by the variable optical attenuator. The optical signals from the variable optical attenuator or externally inserted optical signals are selected by a filter and output. The optical signals from individual filters are multiplexed in the optical multiplexer, and are output as the wavelength multiplexed optical signal. In the variable optical attenuator, the first electrode section in the phase shifter is electrically connected to the second electrode section in the directional coupler. Therefore, a common applied voltage can be used for the application of a voltage across the electrodes. This can minimize the space necessary for the arrangement of the electrodes and can simplify the control system, whereby the size of the variable optical attenuator can be reduced and, in its turn, the size of the optical equalizer can be reduced.

According to the tenth feature of the invention, a waveguide-type optical control device comprises:

a phase shifter comprising two left and right optical waveguides, a first electrode provided on the left side of the left optical waveguide, a second electrode provided on the right side of the right optical waveguide, and a third electrode provided between the two optical waveguides;

a first directional coupler that is connected to one end of the phase shifter and functions to branch an optical signal introduced through one of the two optical waveguides into optical signal parts which are then introduced respectively into the two optical waveguides; and a second directional coupler that is connected to the other end of the phase shifter and functions to couple the optical signal parts received respectively from the two optical waveguides;

at least one of the first and second electrodes and the third electrode having been extended into a part or the whole of the first directional coupler or the second directional coupler, the third electrode in its extended electrode portion being provided so that a longitudinal electric field is applied to one of the two optical waveguides.

According to this construction, the first, second, and third electrodes in the phase shifter are extended into a part or the whole of the first directional coupler or the second directional coupler using common optical waveguides, and, at the same time, the extended portion of the third electrode in the directional coupler is provided so that a longitudinal electric field is applied to one of the optical waveguides. Therefore, upon the application of the voltage across the electrodes in the phase shifter, an electric field is applied to the phase shifter and, at the same time, is also applied from the vertical direction (thicknesswise direction of the electrodes) to the first or second directional coupler to control the refractive index. Since the longitudinal electric field can be applied, in the case of an identical voltage, a strong electric field can be applied while, in the case of an identical electric field, the applied voltage can be lowered. Further, since the coupling length L is equivalently regulated, a deterioration in extinction ratio can be reduced. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

According to the eleventh feature of the invention, a process for producing a waveguide-type optical control device, comprises the steps of:

forming two right and left optical waveguides so as to construct a phase shifter and at least one directional coupler within a substrate;

forming a first electrode and a second electrode respectively on the left side of the left optical waveguide and on the right side of the right optical waveguide so as to extend from the phase shifter to a part of the directional coupler, forming a third electrode between the two optical waveguides so as to extend from the phase shifter to a part of the directional coupler, and, in addition, forming a plurality of independent electrode pieces at a predetermined interval at the end of the second electrode and at the end of the third electrode, or forming a plurality of electrode pieces at a predetermined interval connected to each other or one another in a cascade form through a fuse; and successively wire bonding the necessary number of the plurality of independent electrode pieces from the inner side, or successively fusion cutting the fuse of the necessary number of the plurality of cascaded electrode pieces from the outer side so as to bring the characteristic value of the directional coupler to a desired value.

According to this production process, after a phase shifter and at least one directional coupler are formed by two optical waveguides, the first, second, and third electrodes are formed respectively in predetermined regions of the phase shifter and the directional coupler. In the directional coupler, a plurality of electrode pieces are connected in a cascade form to the end of the first electrode and the end of the second electrode through a fuse or a bonding wire. By virtue of this construction, the length of the first and second electrodes can be finely adjusted. That is, tuning can be performed to provide ideal characteristics.

BRIEF DESCRIPTION OF THE DRAWINGS

The invention will be explained in more detail in conjunction with the appended drawings, wherein:

FIGS. 6A and 6B are characteristic diagrams showing a change in propagation constant upon the application of a bias voltage to a first directional coupler, wherein FIG. 6A represents the case where no bias voltage is applied and FIG. 6B represents the case where a bias voltage is applied;

FIGS. 16A and 16B are characteristic diagrams showing a change in propagation constant upon the application of a bias voltage to a first directional coupler, wherein FIG. 16A represents the case where no bias voltage is applied and FIG. 16B represents the case where a bias voltage is applied;

FIGS. 26A to 26D are cross-sectional views taken on line A—A of FIG. 25, illustrating first to fourth embodiments of the structure of the waveguide-type optical control device shown in FIG. 25;

FIG. 27 is a block diagram showing the construction of an optical equalizer apparatus using the waveguide-type optical control device according to the invention;

FIG. 28 is a block diagram showing the construction of an optical inserting/separating apparatus to which the waveguide-type optical control device according to the invention has been applied.

DESCRIPTION OF THE PREFERRED EMBODIMENTS

Preferred embodiments of the invention will be explained in conjunction with the accompanying drawings.

First Preferred Embodiment

Figure 5:
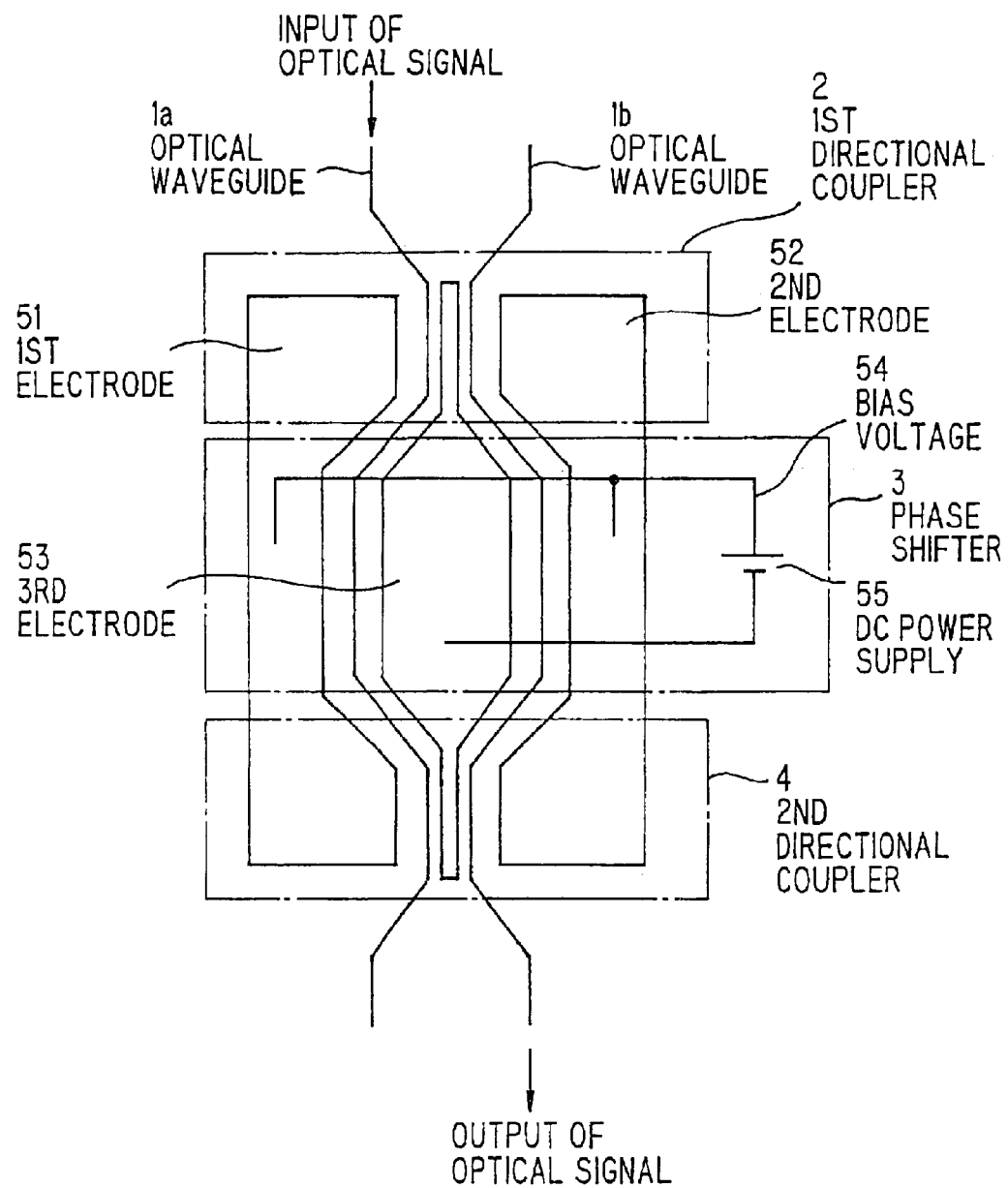
FIG. 5 is a plan view showing the first preferred embodiment of the waveguide-type optical control device according to the invention.

FIG. 5 shows the first preferred embodiment of the waveguide-type optical control device according to the invention. Each of preferred embodiments described later will be explained by taking a variable optical attenuator as a waveguide-type optical control device.

In the waveguide-type optical control device shown in FIG. 5, a first directional coupler 2, a phase shifter 3 (a control unit), and a second directional coupler 4 are disposed in series on an LN substrate (not shown), and optical waveguides 1a, 1b are provided parallel to each other so as to go through these elements. In positions of the first directional coupler 2 and the second directional coupler 4, spacing between the optical waveguides 1a, 1b is narrowed so as to form the directional couplers. Further, a first electrode 51, a second electrode 52, and a third electrode 53 are provided on the LN substrate so as to extend over the first directional coupler 2, the phase shifter 3, and the second directional coupler 4. Specifically, the first electrode 51 is provided on the outside of the optical waveguide 1a, the second electrode 52 is provided on the outside of the optical waveguide 1b, and the third electrode 53 is provided between the optical waveguides 1a and 1b. In other words, this construction is such that the first electrode 3a, the second electrode 3b, and the third electrode 3c in the conventional construction shown in FIG. 1 have been extended into the first directional coupler 2 and the second directional coupler 4.

A bias voltage 54 is applied by a direct current power supply 55 across the first electrode 51 and the third electrode 53 and across the second electrode 52 and the third electrode 53. A positive (+) voltage is applied to the first electrode 51 and the second electrode 52, and a negative (−) voltage is applied to the third electrode 53.

The operation of the first preferred embodiment of the invention will be explained.

An optical signal introduced through the input terminal of the optical waveguide 1a is branched in the first directional coupler 2 into an optical signal part to be traveled through the optical waveguide 1a and an optical signal part to be traveled through the optical waveguide 1b in a branching ratio (rate) of 50:50 (50%), and these branched optical signals are then input into the phase shifter 3. The phase shifter 3 operates according to the bias voltage 54 applied to the first electrode 51 and the second electrode 52. Specifically, when the bias voltage 54 is not applied, the two branched optical signal parts respectively for the optical waveguide 1a and the optical waveguide 1b are then input in an identical phase into the second directional coupler 4, and the whole input light is output from the output terminal of the optical waveguide 1b. When the bias voltage 54 is increased from 0 V to a certain voltage, the refractive index of the optical waveguides 1a and 1b is changed and, consequently, the propagation speed of the optical signals, which travel respectively through the optical waveguides 1a and 1b, is changed.

Since the bias voltage 54 applied to the optical waveguide 1a is opposite in direction to the bias voltage applied to the optical waveguide 1b, a difference occurs in propagation speed between the optical signal, which travels through the optical waveguide 1a, and the optical signal which travels through the optical waveguide 1b in the phase shifter 3. As a result, the optical signal in the optical waveguide 1a and the optical signal in the optical waveguide 1b are input in a mutually different phase into the second directional coupler 4. For this reason, the branching ratio (coupling rate) of the second directional coupler 4 is deviated from the original ratio (rate) 50:50 (50%), and, as a result, a part of the optical signal, which, up to this stage, has been output only from the output terminal of the optical waveguide 1b in the second directional coupler 4, is also output from the optical waveguide 1a. When the bias voltage 54 is increased to about 30 to 50 V, the optical signal is substantially entirely output from the optical waveguide 1a. In this way, setting the bias voltage 54 to a suitable value can provide a desired optical attenuation level.

As described above in connection with the prior art, when the bias voltage 54 was not applied, or when a voltage of about 30 to 50 V was applied, in order to output the whole optical signal from either the optical waveguide 1a or the optical waveguide 1b in the second directional coupler 4, the length of the portion, where the optical waveguides 1a and 1b approach each other, should be accurately brought to the half of the complete coupling length to accurately bring the branching ratio (coupling rate) of the first directional coupler 2 to the second directional coupler 4 to 50:50 (50%). The deviation of the branching ratio (coupling rate) of the first directional coupler 2 to the second directional coupler 4 from 50:50 (50%) results in increased leakage of the optical signal from one waveguide to the other waveguide at the output terminal of the second directional coupler 4 and thus deteriorates the ratio of the minimum attenuation level to the maximum attenuation level (extinction ratio).

On the other hand, according to the invention, the coupling length can be equivalently regulated by virtue of the construction such that three electrodes are provided so as to extend over the first directional coupler 2, the phase shifter 3, and the second directional coupler 4, and an electric field is also applied to the first directional coupler 2 and the second directional coupler 4, whereby the propagation constants respectively in the directional couplers 2, 4 can be regulated.

Specifically, in the first directional coupler 2 in its portion where the optical waveguides 1a and 1b approach each other, a voltage is applied to the optical waveguides 1a, 1b in such a manner that the direction of the voltage applied to the optical waveguide 1a is opposite to the direction of the voltage applied to the optical waveguide 1b, whereby a difference in propagation speed occurs between optical signals which propagate through the first directional coupler 2. Thus, propagation constants (βa, βb) of the optical waveguides 1a and 1b can be equivalently varied.

Figure 6A:
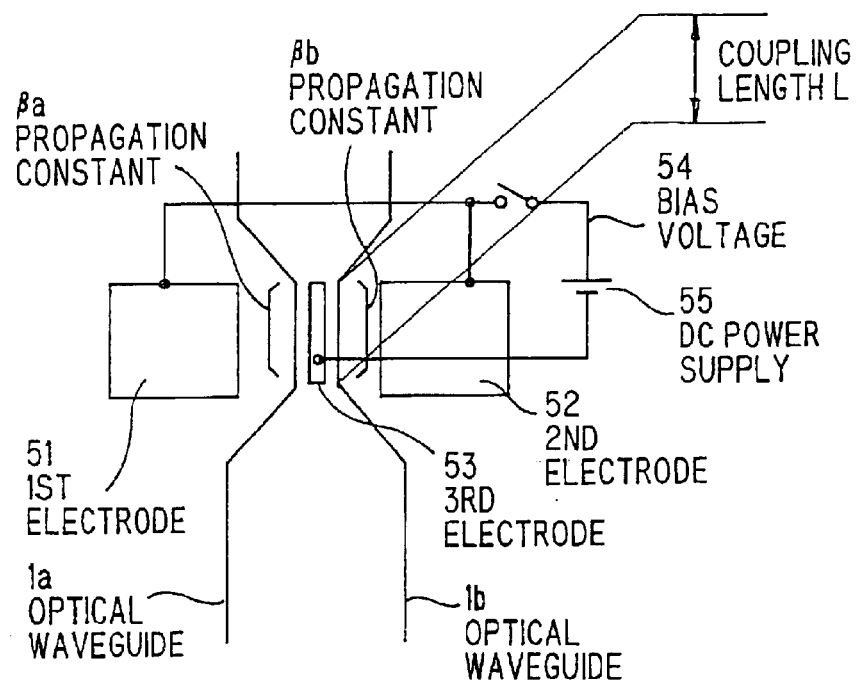
Figure 6B:
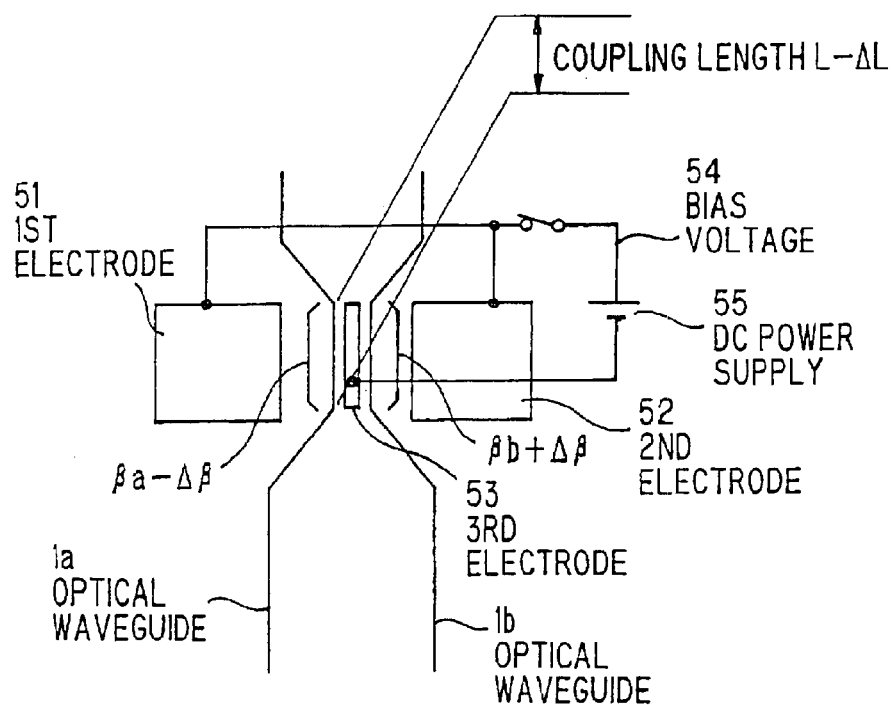

FIGS. 6A and 6B show a change in propagation constant upon the application of a bias voltage 54 to the first directional coupler 2, wherein FIG. 6A represents the case where no bias voltage 54 is applied and FIG. 6B represents the case where a bias voltage 54 is applied.

As shown in FIG. 6A, when no bias voltage is applied across the first and second electrodes 51, 52 and the third electrode 53, the propagation constants of the optical waveguides 1a and 1b in the directional coupler are βa and βb, respectively. Upon the application of a bias voltage to the electrodes, as shown in FIG. 6B, the propagation constants of the optical waveguides 1a and 1b in the directional coupler are changed to (βa−Δβ) and (βb+Δβ), respectively. As a result, the coupling length L is brought to (L−ΔL). Thus, the coupling length of the first directional coupler 2 is equivalently regulated.

In FIGS. 6A and 6B, explanation has been made on the first directional coupler 2. However, it is needless to say that this is true of the second directional coupler 4. The regulation of the coupling length of the directional couplers in this way permits the branching ratio (coupling rate) to be accurately brought to 50:50 (50%). Since the voltage applied to the first directional coupler 2 (or second directional coupler 4) is identical to the voltage applied to the phase shifter 3, optimization is not done over the whole dynamic range in the optical variable attenuator according to the invention. However, the present inventors have confirmed that a ratio of the minimum attenuation level to the maximum attenuation level (extinction ratio), which is satisfactory for practical use, can be ensured in an actually used region (bias voltage 54=0 (zero) to about 50 V).

Figure 2:
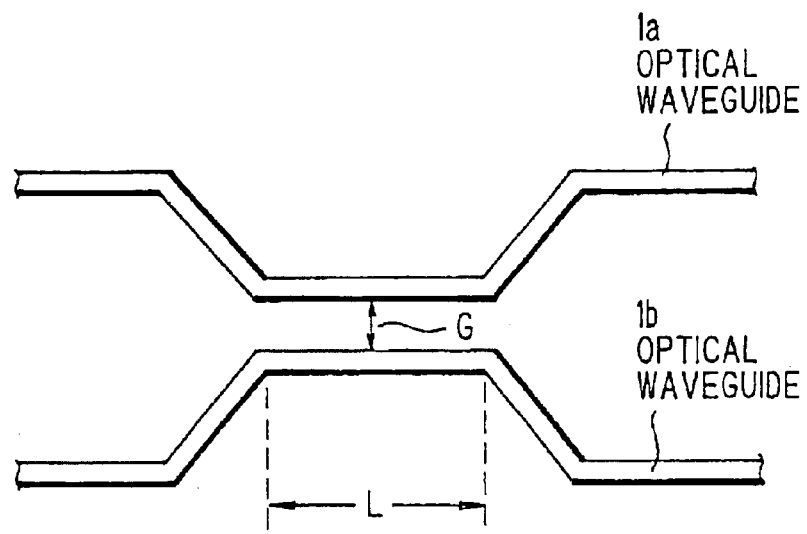
FIG. 2 is a typical diagram showing the relationship between the gap and the coupling length in a directional coupler.
Figure 3:
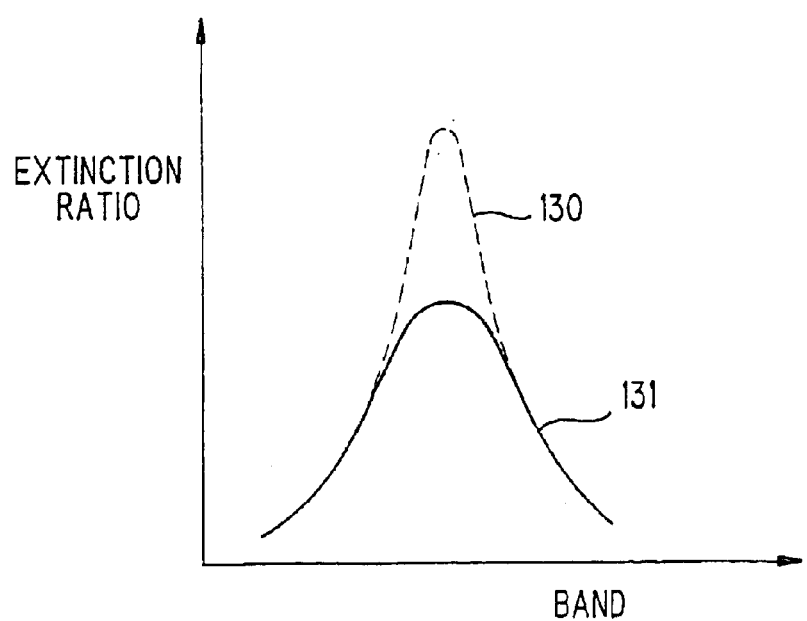
FIG. 3 is a diagram showing a difference in characteristics attributable to a difference in production parameter.
Figure 4:
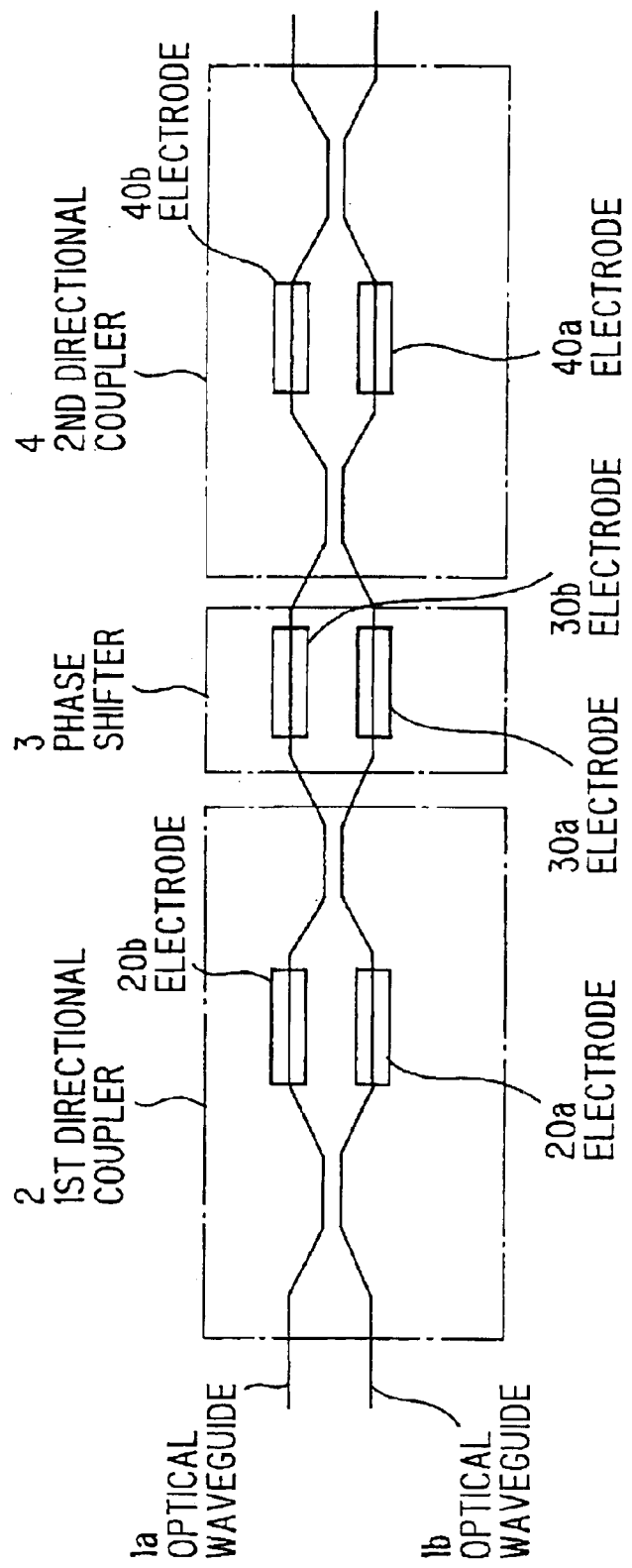
FIG. 4 is a plan view showing another conventional waveguide-type optical control device.

For the waveguide-type optical control device (variable optical attenuator) having the above construction, since the coupling length can be equivalently regulated, the deterioration in the extinction ratio can be reduced. Further, since three electrodes in total suffice for constituting the device, unlike the conventional construction shown in FIG. 2, increasing the size of the device is not required, and, thus, the complication of the control system can be avoided.

Second Preferred Embodiment

Figure 7:
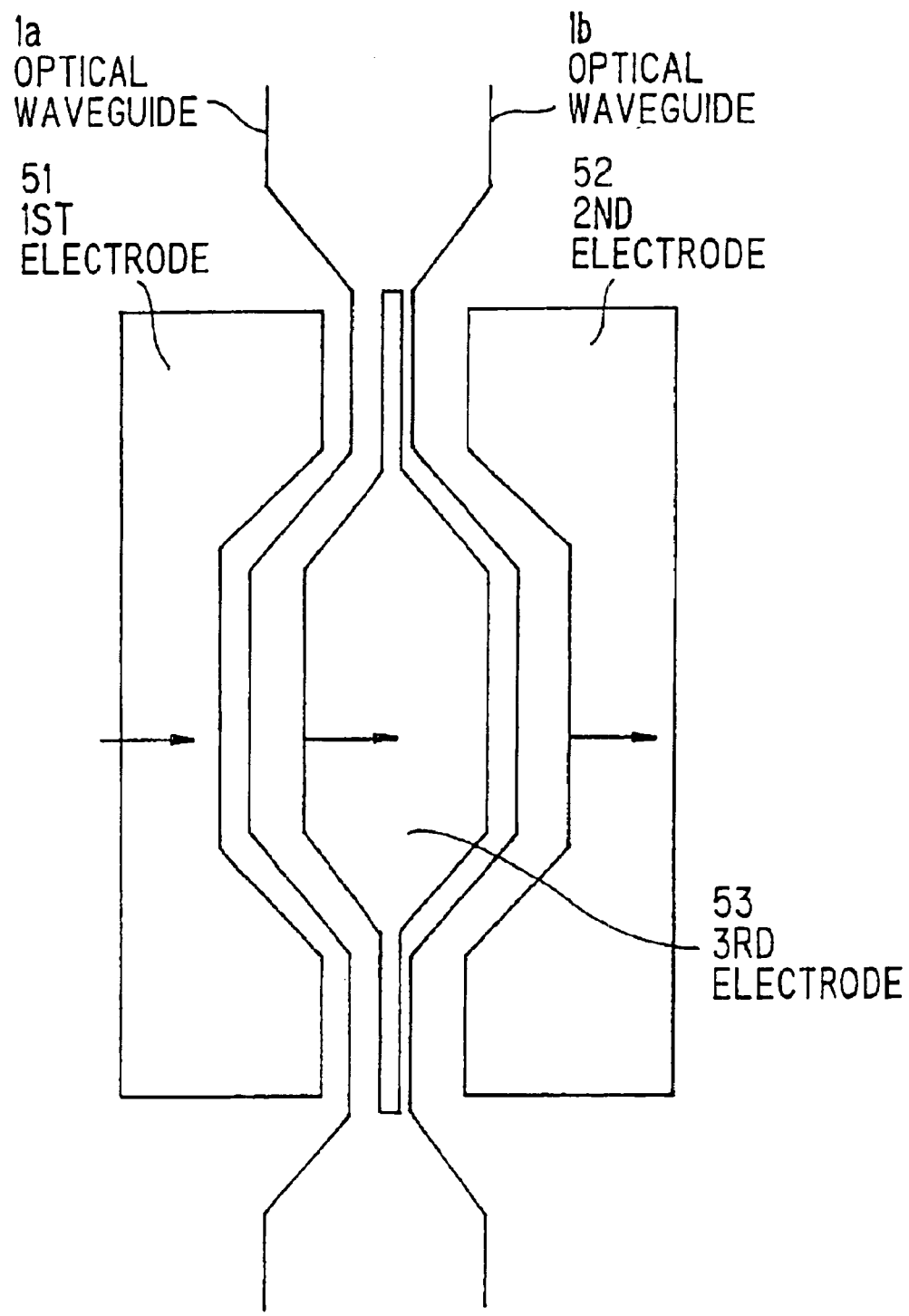
FIG. 7 is a plan view showing the second preferred embodiment of the invention.

FIG. 7 shows the second preferred embodiment of the invention.

The construction of this second preferred embodiment is identical to that of the first preferred embodiment of the invention in that the first electrode 51, the second electrode 52, and the third electrode 53 are provided. The difference between the first and second preferred embodiments is that the position of each of the electrodes has been offset in a direction orthogonal to the optical waveguides 1a, 1b (a right or left direction in the drawing). In FIG. 7, the electrodes have been shifted toward a direction indicated by an arrow (on the optical waveguide 1b side). This arrangement can provide the same effect as the arrangement in the first preferred embodiment of the invention. As a result, there is no need to closely position the electrodes 51 to 53 relative to the optical waveguides 1a, 1b. This can reduce the variation in products.

Figure 8A:
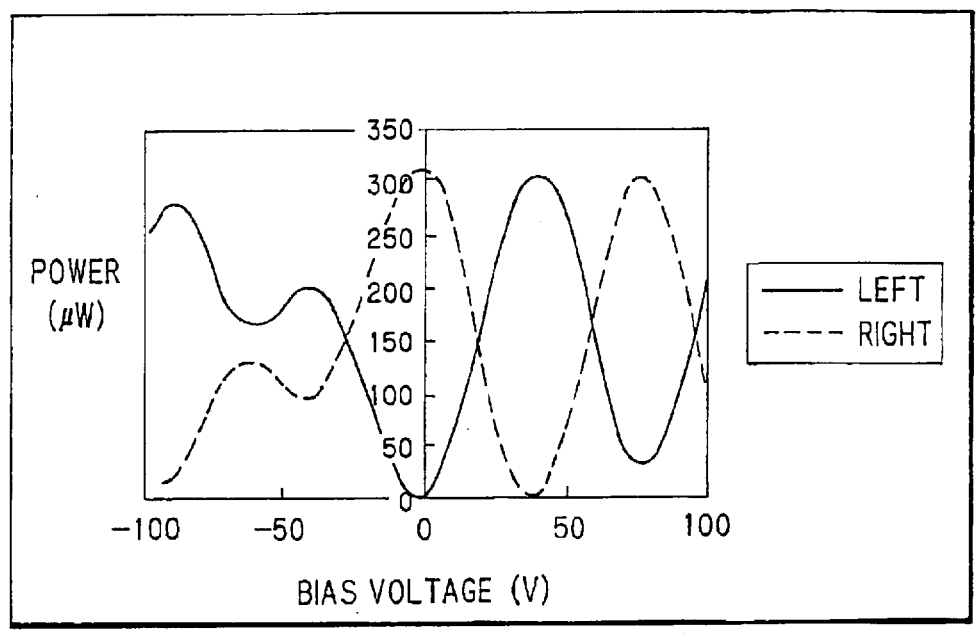
FIGS. 8A and 8B are characteristic diagrams showing extinction ratio characteristics in the waveguide-type optical control device shown in FIG. 7.
Figure 8B:
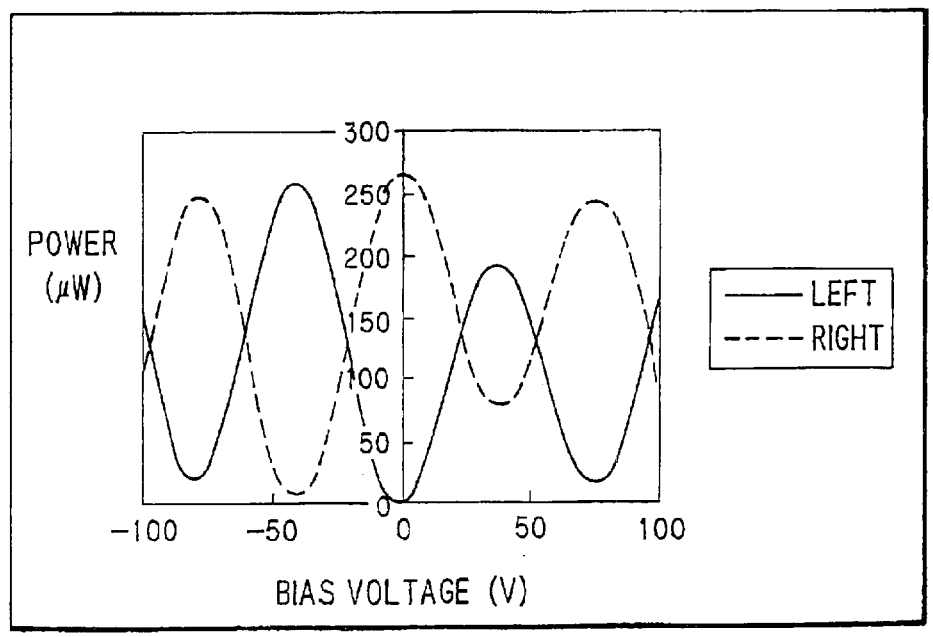

FIGS. 8A and 8B show extinction ratio (ratio of the minimum attenuation level to the maximum attenuation level) characteristics in the variable optical attenuator shown in FIG. 7, wherein FIG. 8A represents the case where each electrode has been offset in the right direction and FIG. 8B represents the case where each electrode has been offset in the left direction. Thus, the output state of the optical power can be varied as desired by offsetting the electrodes in either the right direction or the left direction.

As is apparent from FIG. 8, a ratio of the minimum attenuation level to the maximum attenuation level (extinction ratio), which is satisfactory for practical use, can be ensured in an actually used region (applied voltage (bias voltage 54)=0 (zero) to about 50 V).

Third Preferred Embodiment

Figure 9:
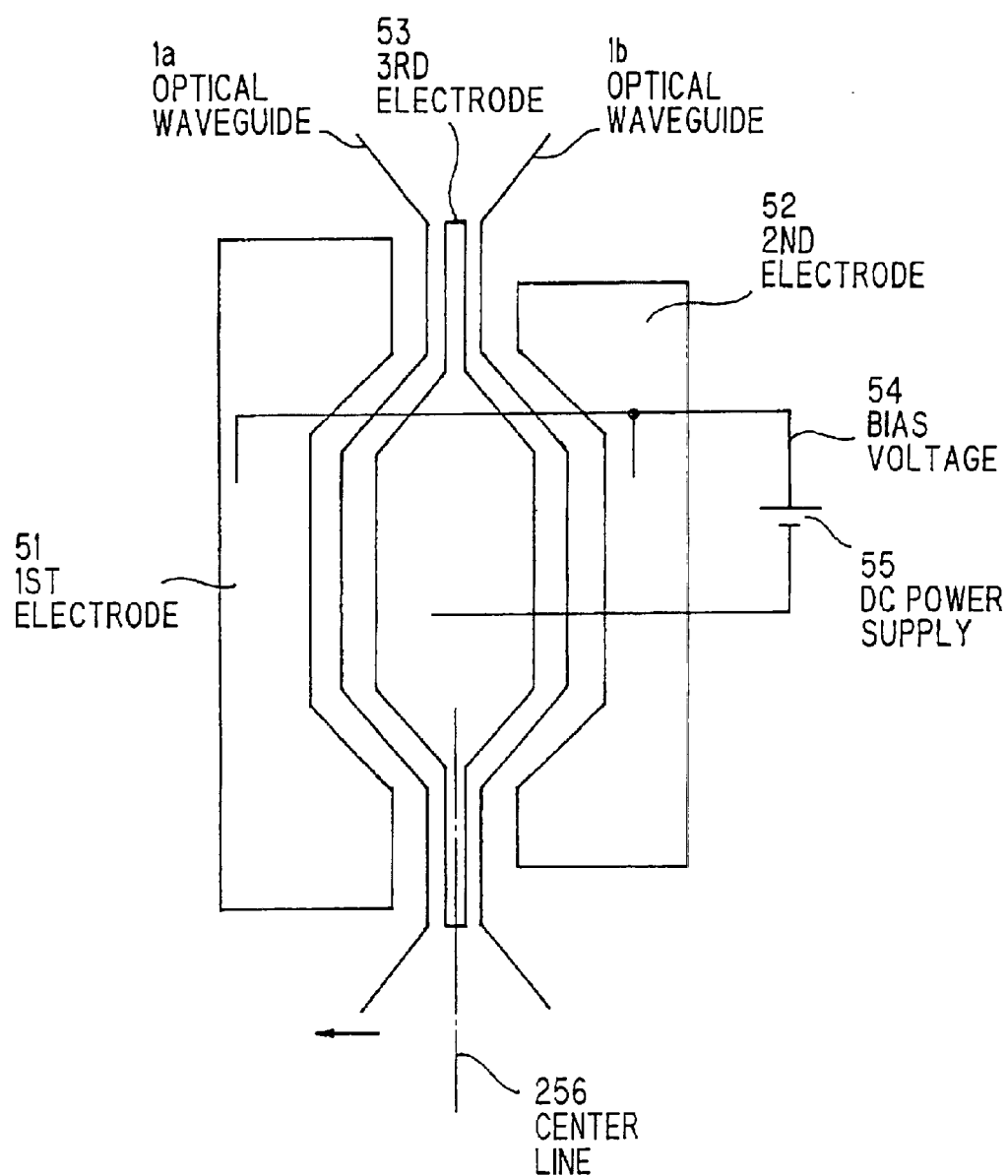
FIG. 9 is a plan view showing the third preferred embodiment of the invention.

FIG. 9 shows the third preferred embodiment of the invention.

This preferred embodiment is characterized in that the shape of the first electrode 51 is different from that of the second electrode 52. Specifically, the construction of the third preferred embodiment of the invention is such that the first electrode 51 and the second electrode 52 are provided so as to be asymmetrical in terms of length about a center line 256 between the optical waveguides 1a, 1b (the length of the second electrode 52 is smaller than that of the first electrode 51) and a bias voltage 54 is applied across the first and second electrodes 51, 52 and the third electrode 53. In this preferred embodiment, the propagation constant can be changed from βb to βb' by regulating the length of the second electrode 52. By virtue of this, the propagation constant β of the optical waveguide 1a can be made different from that of the optical waveguide 1b. Therefore, in the case of a variable optical attenuator, the optical level attenuation value of the optical waveguide 1a and the optical level attenuation value of the optical waveguide 1b can be controlled so as to be different from each other.

Fourth Preferred Embodiment

Figure 10:
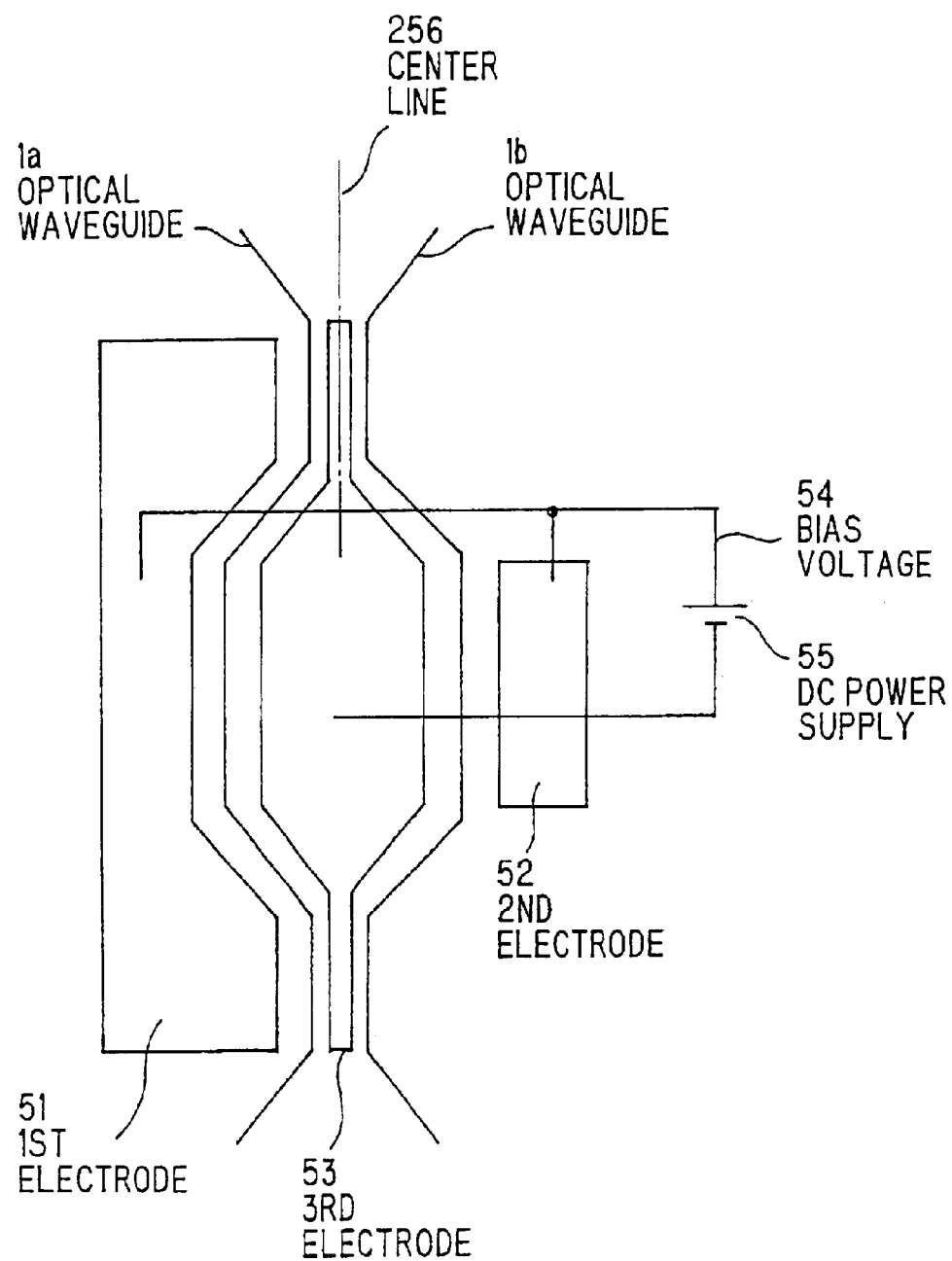
FIG. 10 is a plan view showing the fourth preferred embodiment of the invention.

FIG. 10 shows the fourth preferred embodiment of the invention.

This preferred embodiment is also characterized in that shape of the first electrode 51 is different from that of the second electrode 52. Specifically, the length of the second electrode 52 is equal to the length of the straight portion of the optical waveguide 1b in the phase shifter 3, and the whole second electrode 52 is quadrangular. Also in this case, the bias voltage 54 is applied across the first and second electrodes 51, 52 and the third electrode 53.

In the case of the preferred embodiment shown in FIG. 10, the second electrode 52 does not extend to the first directional coupler 2 and the second directional coupler 4 in the optical waveguide 1b. Therefore, with respect to the optical waveguide 1b portion, the arrangement of the electrode is the same as that of the electrode in the optical waveguide 1b in the conventional device shown in FIG. 1. That is, according to this preferred embodiment, the three electrodes 51 to 53 can be made effective only for the optical waveguide 1a, and any electric field is not applied to the optical waveguide 1b in the directional couplers 2, 4. This construction is advantageous when an improvement in the extinction ratio in only one of the optical waveguides 1a and 1b is desired. Further, according to this construction, since the electrode size in any one of the optical waveguides 1a and 1b can be reduced, the area occupied by the waveguide-type optical control device can be reduced.

Fifth Preferred Embodiment

Figure 11:
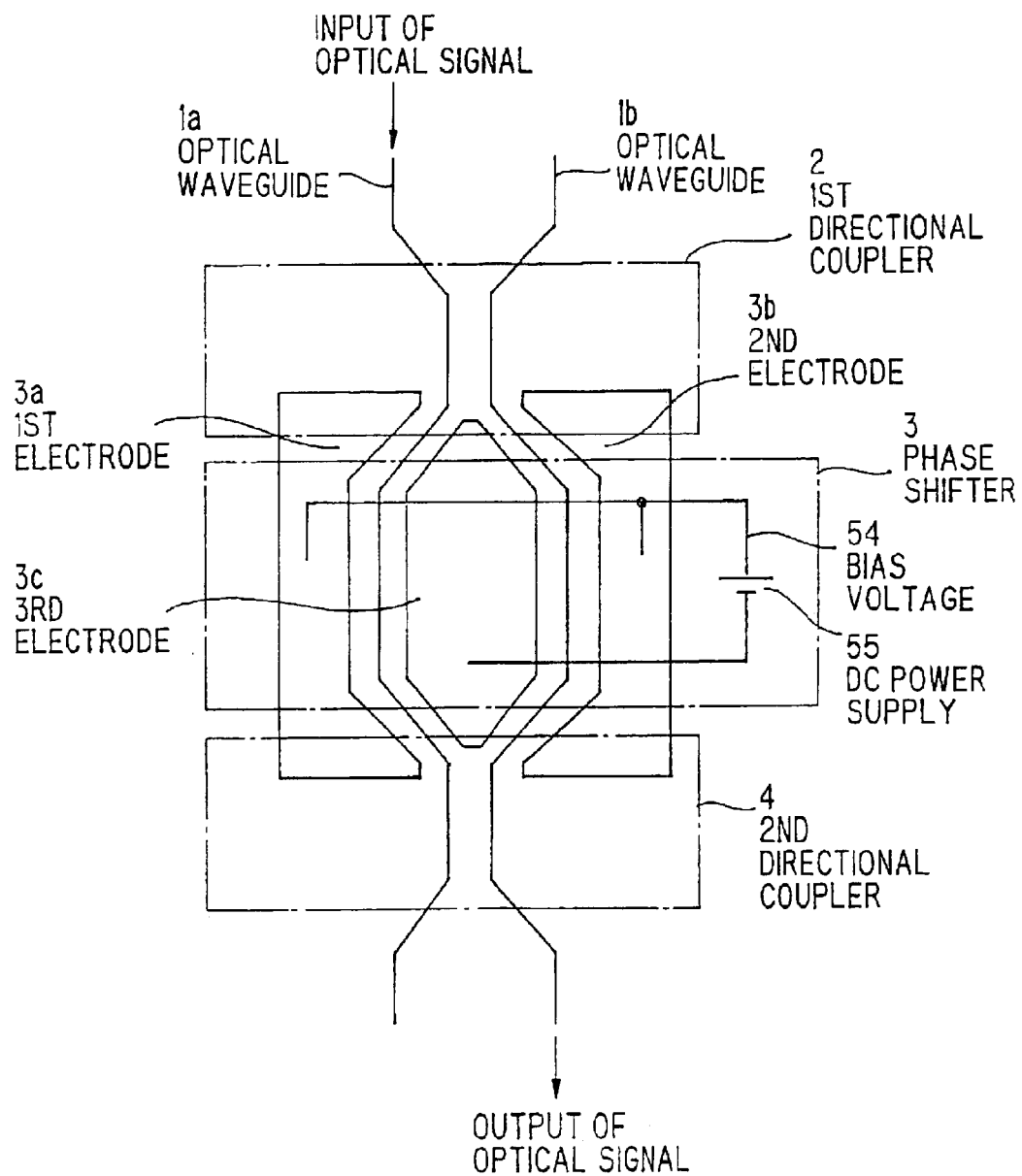
FIG. 11 is a plan view showing the fifth preferred embodiment of the invention.

FIG. 11 shows the fifth preferred embodiment of the invention.

This preferred embodiment is different from the above preferred embodiments in that the length of each electrode is somewhat larger than the length of the phase shifter 3. That is, the end of each electrode is somewhat extended into the first directional coupler 2 and the second directional coupler 4. In this case, the bias voltage 54 is applied by the same manner as used in each of the above preferred embodiments.

According to this preferred embodiment, as compared with the first preferred embodiment, the ability to regulate the coupling rate is somewhat inferior. Since, however, the area of the electrode can be reduced, the size of the waveguide-type optical control device can be reduced.

Sixth Preferred Embodiment

Figure 12:
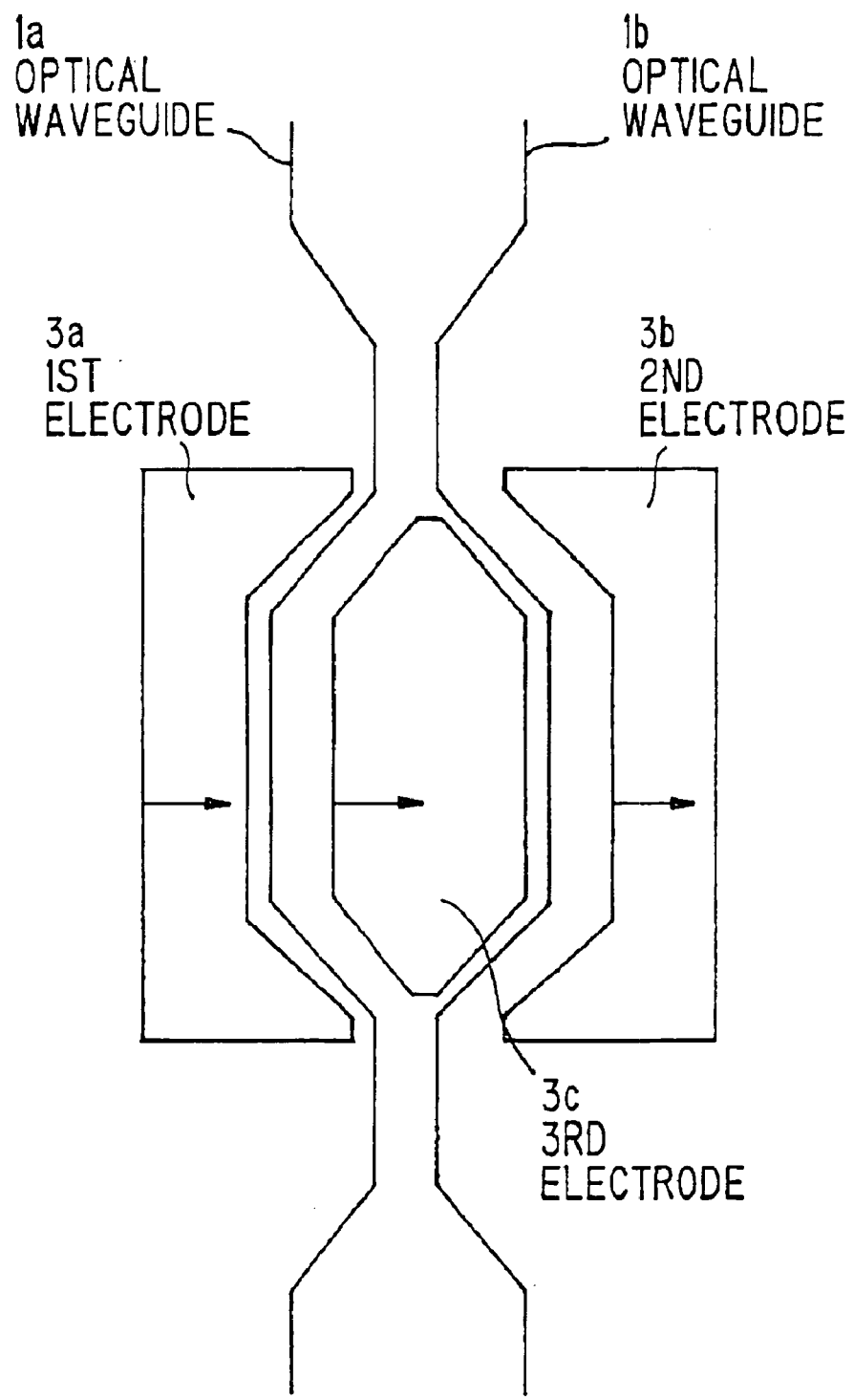
FIG. 12 is a plan view showing the sixth preferred embodiment of the invention.

FIG. 12 shows the sixth preferred embodiment.

This preferred embodiment is a variant of the preferred embodiment shown in FIG. 11. That is, the construction of the sixth preferred embodiment is such that the construction shown in FIG. 7 has been added to the construction shown in FIG. 11. More specifically, in the construction of the sixth preferred embodiment, the first electrode 51, the second electrode 52, and the third electrode 53 have been offset with respect to the center line 256 between the optical waveguides 1a, 1b. In FIG. 12, the first electrode 51, the second electrode 52, and the third electrode 53 have been shifted or offset in the right direction in the drawing. In this preferred embodiment, the bias voltage 54 is applied to each electrode in the same manner as described above in connection with the preferred embodiment shown in FIG. 11. This construction has both the feature of the preferred embodiment shown in FIG. 11 and the feature of the preferred embodiment shown in FIG. 7. Therefore, the freedom of the arrangement of the electrode is high, and, in addition, the area of the electrode can be made small, contributing to a reduction in size of the waveguide-type optical control device.

Figure 13:
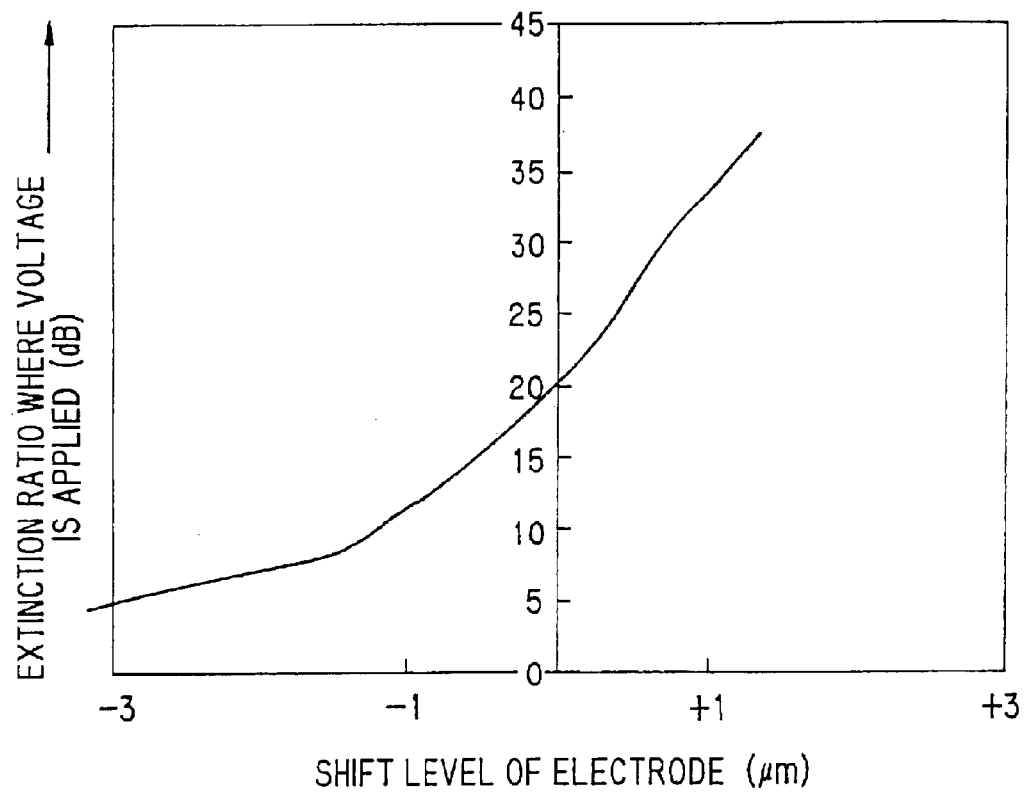
FIG. 13 is a characteristic diagram showing extinction ratio characteristics in the waveguide-type optical control device shown in FIG. 12.

FIG. 13 shows extinction ratio (ratio of the minimum attenuation level to the maximum attenuation level) characteristics in the preferred embodiment shown in FIG. 12 wherein the three electrodes have been simultaneously offset in the right or left direction from the center between the two waveguides. As is apparent from FIG. 13, the obtained ratio of the minimum attenuation level to the maximum attenuation level (extinction ratio) is satisfactory for practical use.

Seventh Preferred Embodiment

Figure 14:
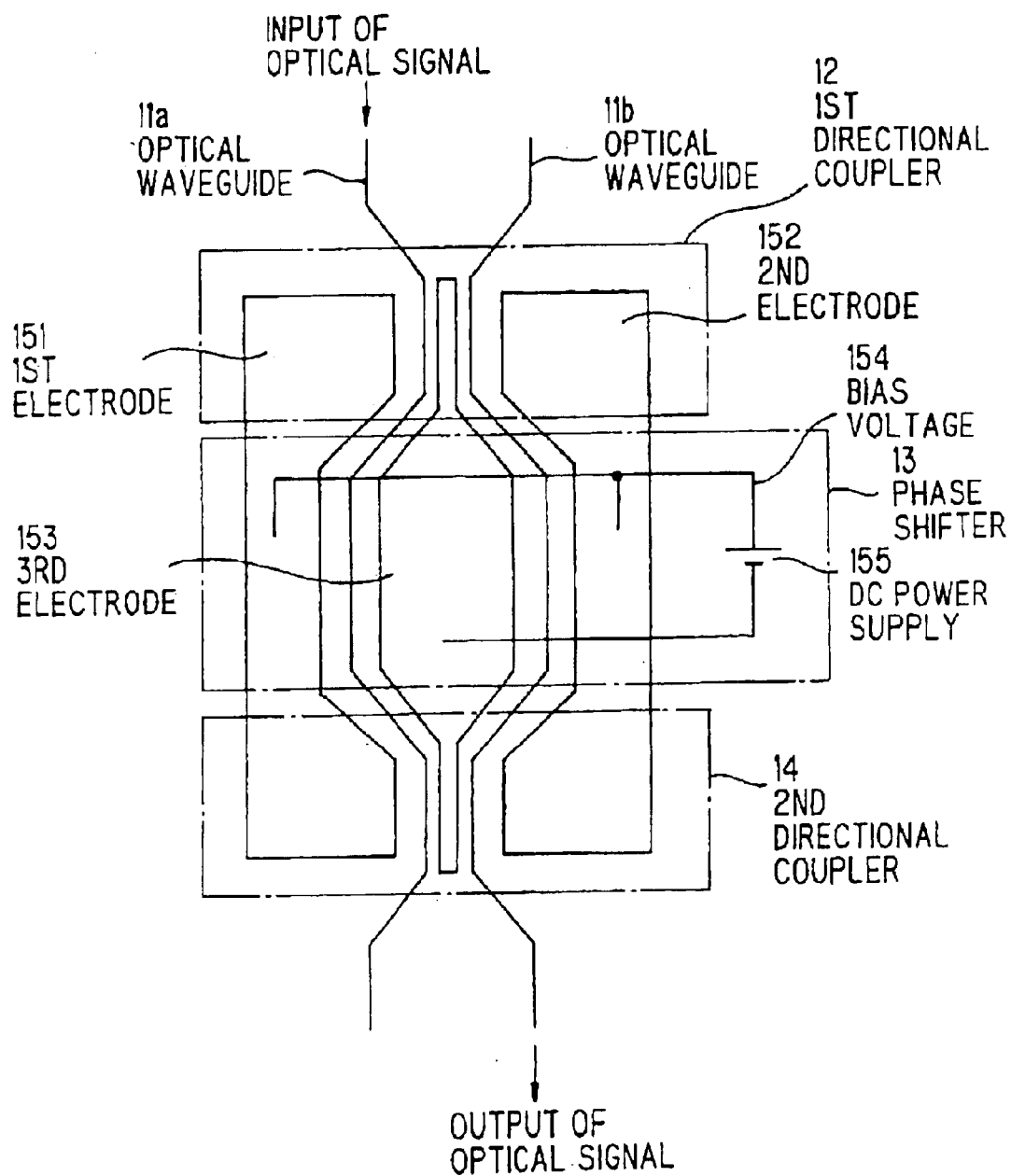
FIG. 14 is a plan view showing the seventh preferred embodiment of the waveguide-type optical control device according to the invention.

FIG. 14 shows the seventh preferred embodiment of the waveguide-type optical control device according to the invention.

In this preferred embodiment, a first directional coupler 12, a phase shifter 13 (a phase shifter), and a second directional coupler 14 are arranged in series on an LN substrate (not shown), and optical waveguides 11a, 11b are provided parallel to each other so as to go through these elements. In positions of the first directional coupler 12 and the second directional coupler 14, spacing between the optical waveguides 11a, 11b is narrowed so as to form the directional coupler. Further, a first electrode 151, a second electrode 152, and a third electrode 153 are provided on the LN substrate so as to extend over the first directional coupler 12, the phase shifter 13, and the second directional coupler 14.

Specifically, the first electrode 151 is provided on the outside of the optical waveguide 11a, the second electrode 152 is provided on the outside of the optical waveguide 11b, and the third electrode 153 is provided between the optical waveguides 11a and 11b. In other words, this construction is such that the first electrode 3a, the second electrode 3b, and the third electrode 3c in the conventional construction shown in FIG. 1 have been extended into the first directional coupler 2 and the second directional coupler 4. A bias voltage 154 is applied by a direct current power supply 155 across the first and second electrodes 151, 152 and the third electrode 153. A positive (+) voltage is applied to the first electrode 151 and the second electrode 152, and a negative (−) voltage is applied to the third electrode 153.

In the construction shown in FIG. 14, a combination of three electrodes of the first electrode 151, the second electrode 152, and the third electrode 153 provided in the phase shifter 13 constitutes a first electrode section, a combination of three electrodes of the first electrode 151, the second electrode 152, and the third electrode 153 provided in the first directional coupler 12 constitutes a second electrode section, and a combination of three electrodes of the first electrode 151, the second electrode 152, and the third electrode 153 provided in the second directional coupler 14 constitutes a third electrode section.

The operation of the seventh preferred embodiment of the invention will be explained.

An optical signal introduced through the input terminal of the optical waveguide 11a is branched in the first directional coupler 12 into an optical signal part to be traveled through the optical waveguide 11a and an optical signal part to be traveled through the optical waveguide 11b in a branching ratio (rate) of 50:50 (50%), and these branched optical signals are then input into the phase shifter 13. The phase shifter 13 operates according to the bias voltage 154 applied to the first electrode 151 and the second electrode 152. Specifically, when the bias voltage 154 is not applied, the two branched optical signal parts respectively for the optical waveguide 11a and the optical waveguide 11b are then input in an identical phase into the second directional coupler 14, and the whole input light is output from the output terminal of the optical waveguide 11b. When the bias voltage 154 is increased from 0 (zero) V to a certain voltage, the refractive index of the optical waveguides 11a and 11b is changed and, consequently, the propagation speed of the optical signals, which travel respectively through the optical waveguides 11a and 11b, is changed.

Since the bias voltage 154 applied to the optical waveguide 11a is opposite in direction to the bias voltage applied to the optical waveguide 11b, a difference occurs in propagation speed between the optical signal, which travels through the optical waveguide 11a, and the optical signal which travels through the optical waveguide 11b in the phase shifter 13. As a result, the optical signal in the optical waveguide 11a and the optical signal in the optical waveguide 11b are input in a mutually different phase into the second directional coupler 14. For this reason, the branching ratio (coupling rate) of the second directional coupler 14 is deviated from the original ratio (rate) 50:50 (50%), and, as a result, a part of the optical signal, which, up to this stage, has been output only from the output terminal of the optical waveguide 11b in the second directional coupler 14, is also output from the optical waveguide 11a. When the bias voltage 154 is increased to about 30 to 50 V, the optical signal is substantially entirely output from the optical waveguide 11a. In this way, an optical output signal brought to a desired optical attenuation level can be obtained by setting the bias voltage 154 to a suitable value.

As described above in connection with the prior art, when the bias voltage 154 was not applied, or when a high voltage of about 30 to 50 V was applied, in order to output the whole optical signal from either the optical waveguide 11a or the optical waveguide 11b in the second directional coupler 14, the length of the portion, where the optical waveguides 11a and 11b in the directional coupler approach each other, i.e., coupling length L, should be accurately brought to the half of the complete coupling length Lc to accurately bring the branching ratio (coupling rate) of the first directional coupler 12 to the second directional coupler 14 to 50:50 (50%). The deviation of the branching ratio (coupling rate) of the first directional coupler 12 to the second directional coupler 14 from 50:50 (50%) results in increased leakage of the optical signal from one waveguide to the other waveguide at the output terminal of the second directional coupler 14 and thus deteriorates the ratio of the minimum attenuation level to the maximum attenuation level (extinction ratio).

On the other hand, according to the present preferred embodiment wherein the electrode section comprising three electrodes has also been provided in the first directional coupler 12 and the second directional coupler 14, an electric field is also applied to the optical waveguides within these directional couplers and, thus, the propagation constants of the respective directional couplers 12, 14 can be regulated. By virtue of this, the coupling length L is equivalently regulated. Specifically, in the first directional coupler 12 in its portion where the optical waveguides 11a and 11b approach each other, a voltage is applied to the optical waveguides 11a, 11b in such a manner that the direction of the voltage applied to the optical waveguide 11a is opposite to the direction of the voltage applied to the optical waveguide 11b, whereby a difference in propagation speed occurs between optical signals which propagate through the first directional coupler 12. Thus, propagation constants ($\beta a$, $\beta b$) of the optical waveguides 11a and 11b can be equivalently varied.

Figure 15A:
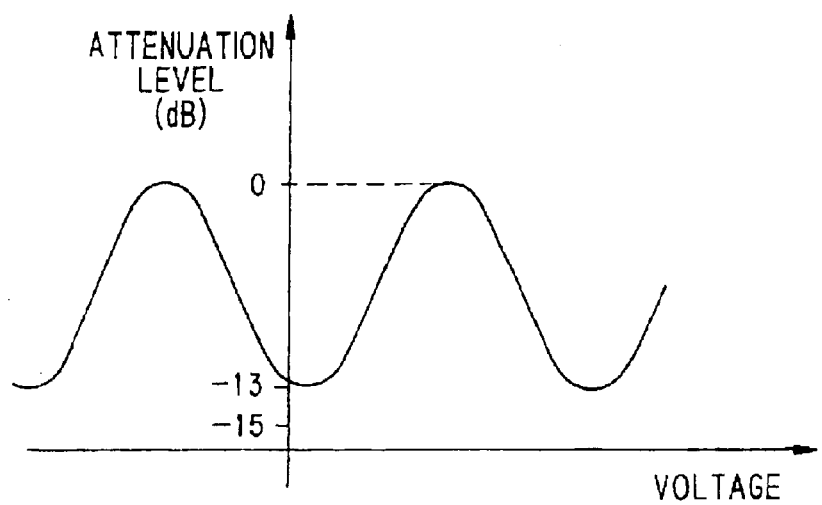
FIGS. 15A and 15B are characteristic diagrams showing the results of the comparison of characteristics obtained by the conventional construction with characteristics obtained by the construction according to the invention.
Figure 15B:
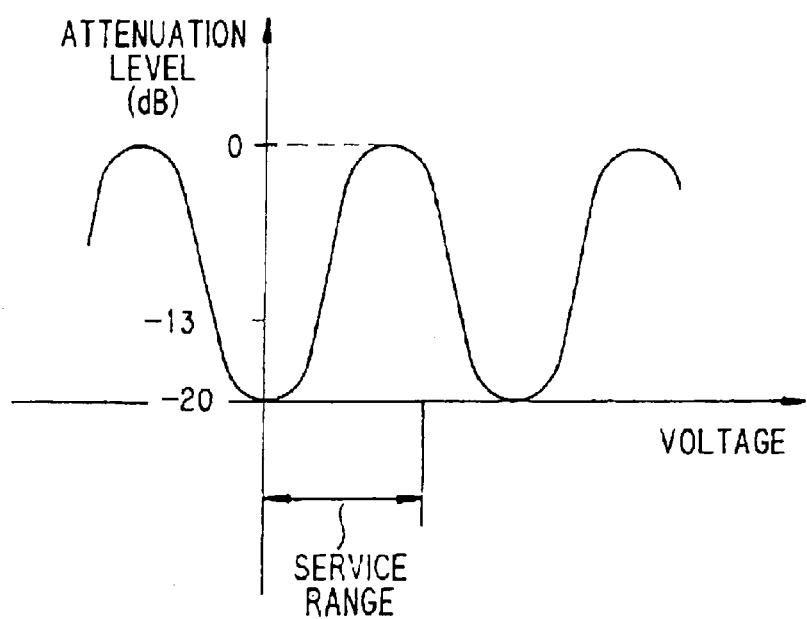

FIGS. 15A and 15B show the results of the comparison of the characteristics obtained by the conventional construction with the characteristics obtained by the construction of this preferred embodiment of the invention.

Figure 1:
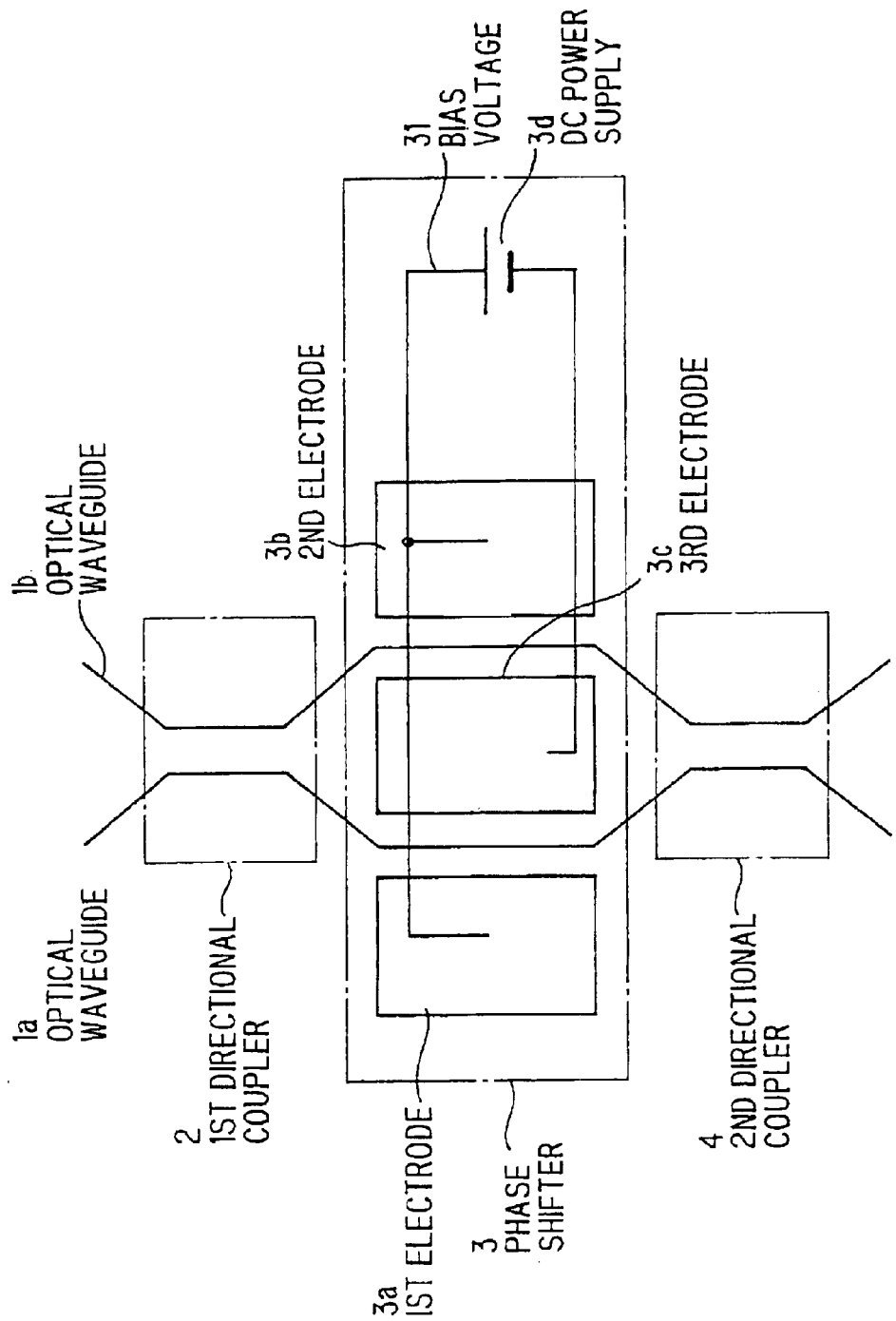
FIG. 1 is a plan view showing the construction of a conventional waveguide-type optical control device having a directional coupler-type Mach-Zehnder (MZ) construction.

FIG. 15A shows characteristics obtained by the construction of the conventional waveguide-type optical control device shown in FIG. 1, and FIG. 15B shows characteristics obtained by the construction of the waveguide-type optical control device, shown in FIG. 14, according to the seventh preferred embodiment of the invention. As can be seen from FIG. 15A showing the characteristics of the conventional construction, the maximum attenuation level (=insertion loss) is 13 dB at the highest. By contrast, as can be seen from FIG. 15B showing the characteristics of the construction according to the seventh preferred embodiment of the invention, when the voltage applied to the electrode is in the range of 0 (zero) to several tens of volts, the maximum attenuation level reaches 20 dB. This indicates that the characteristics have been significantly improved.

Figure 16A:
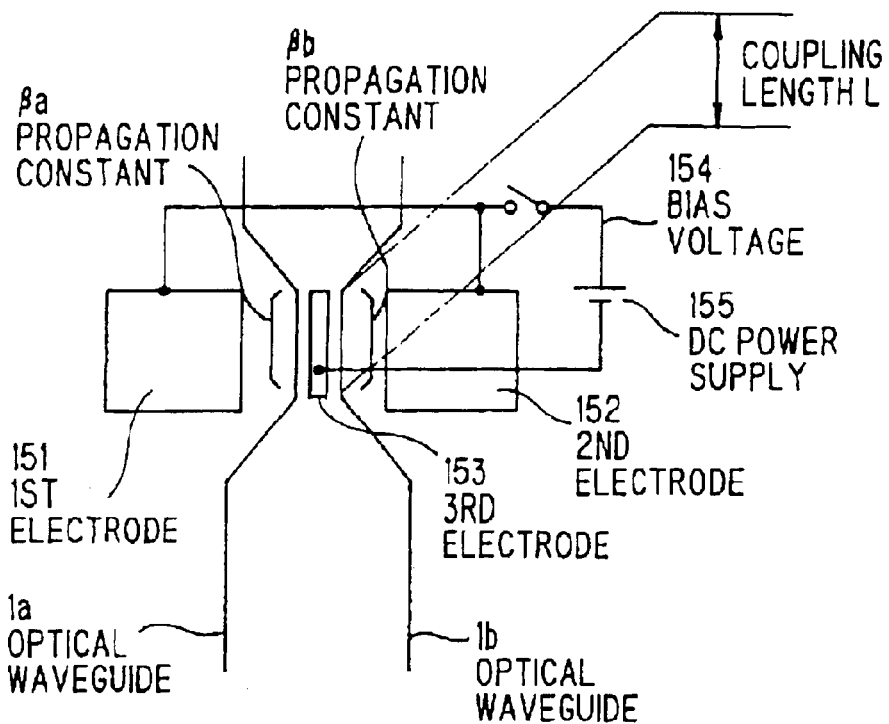
Figure 16B:
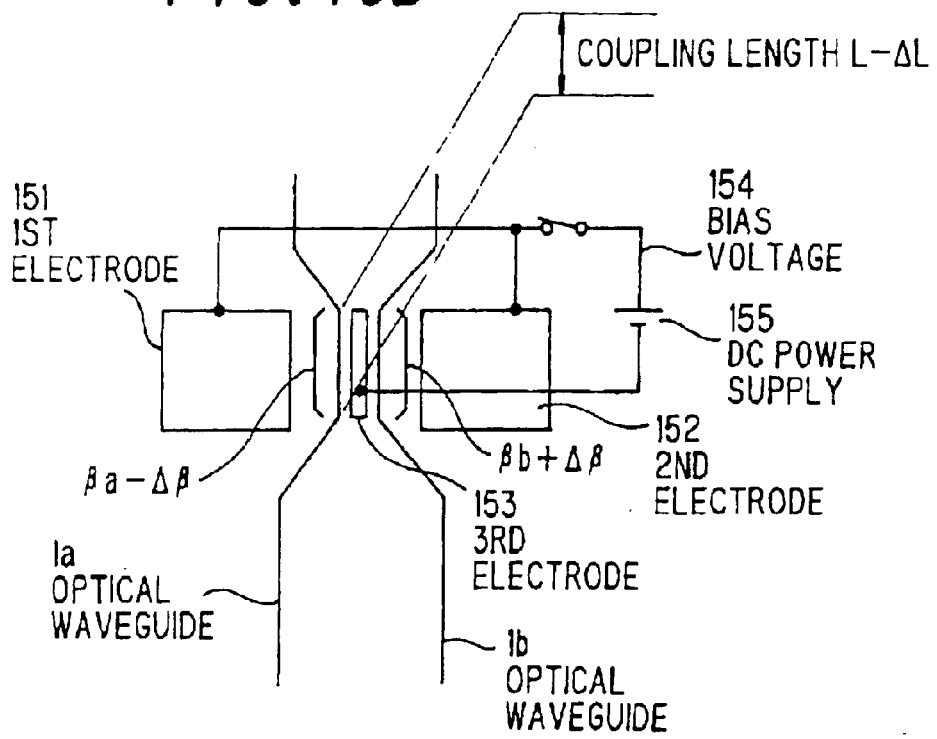

FIGS. 16A and 16B show a change in propagation constant upon the application of a bias voltage 154 to the first directional coupler 12, wherein FIG. 16A represents the case where no bias voltage 154 is applied and FIG. 16B represents the case where a bias voltage 154 is applied.

As shown in FIG. 16A, when no bias voltage is applied across the first and second electrodes 151, 152 and the third electrode 153, the propagation constants of the optical waveguides 11a and 11b in the directional coupler are $\beta a$ and $\beta b$, respectively. Upon the application of a bias voltage to the electrodes, as shown in FIG. 16B, the propagation constants of the optical waveguides 11a and 11b in the directional coupler are changed to ($\beta a - \Delta \beta$) and ($\beta b + \Delta \beta$), respectively. As a result, the coupling length L is brought to (L-$\Delta$L). Thus, the coupling length L of the first directional coupler 12 is equivalently regulated.

In FIGS. 16A and 16B, explanation has been made on the first directional coupler 12. However, it is needless to say that this is true of the second directional coupler 14. The regulation of the coupling length L of the directional couplers in this way permits the branching ratio (coupling rate) to be accurately brought to 50:50 (50%). Since the voltage applied to the first directional coupler 12 (or second directional coupler 14) is identical to the voltage applied to the phase shifter 13, optimization is not done over the whole dynamic range in the optical variable attenuator according to the invention. However, the present inventors have confirmed that a ratio of the minimum attenuation level to the maximum attenuation level (extinction ratio), which is satisfactory for practical use, can be ensured in an actually used region (bias voltage 154=0 (zero) to about 50 V).

For the waveguide-type optical control device having the above construction, since the coupling length L can be equivalently regulated; the deterioration in the extinction ratio can be reduced. Further, since three electrodes in total suffice for constituting the device, unlike the conventional construction shown in FIG. 1, increasing the size of the device is not required, and, thus, the complication of the control system can be avoided.

Eighth Preferred Embodiment

Figure 17:
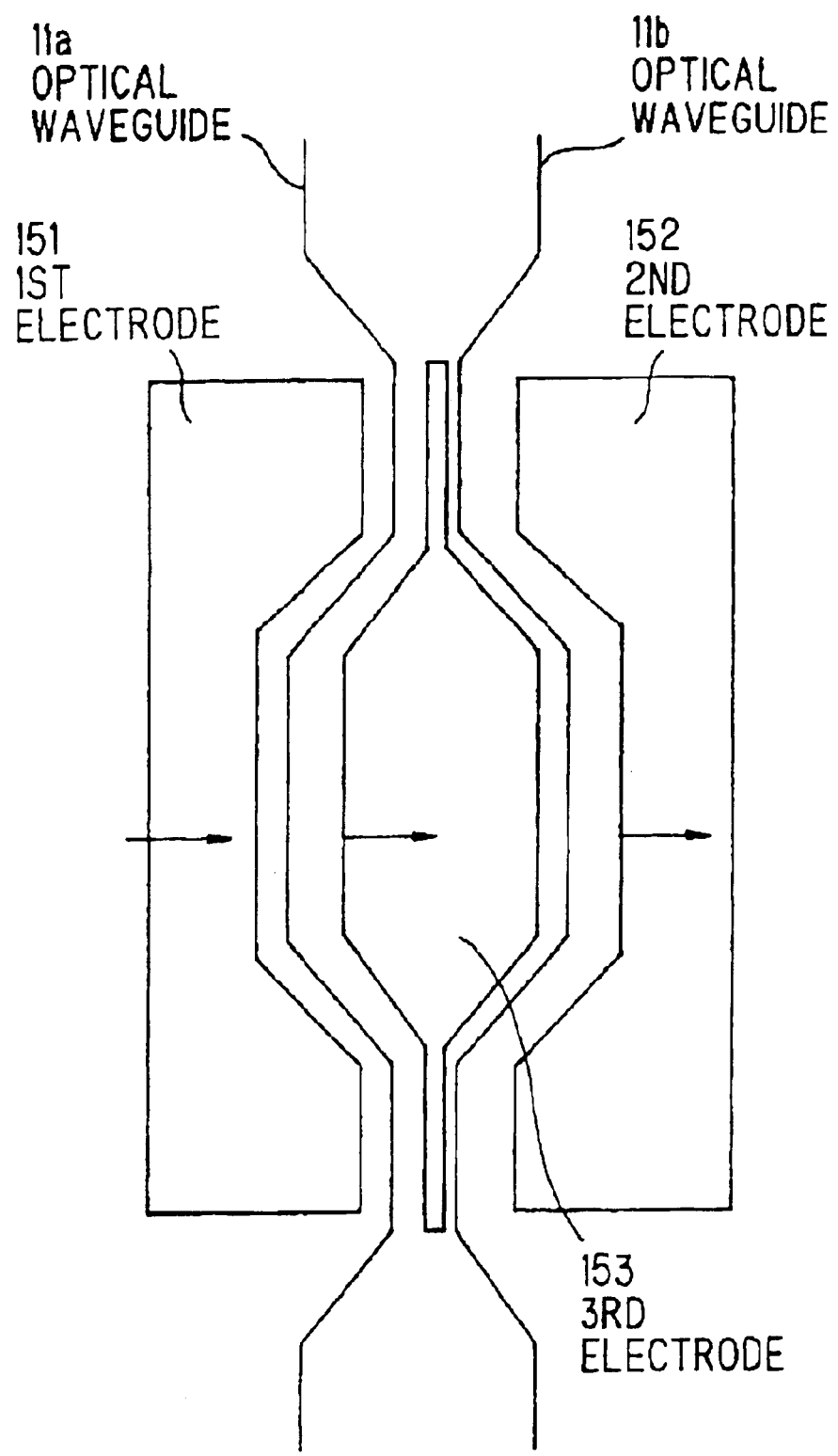
FIG. 17 is a plan view showing the eighth preferred embodiment of the waveguide-type optical control device according to the invention.

FIG. 17 shows the eighth preferred embodiment of the invention.

The construction of this eighth preferred embodiment is identical to that of the seventh preferred embodiment of the invention in that the first electrode 151, the second electrode 152, and the third electrode 153 are provided. The difference between the seventh and eighth preferred embodiments is that the position of each of the electrodes has been offset in a direction orthogonal to the optical waveguides 11a, 11b (the right or left direction in the drawing). In FIG. 17, the electrodes have been shifted toward a direction indicated by an arrow (on the optical waveguide 11b side). This arrangement can provide the same effect as the arrangement in the seventh preferred embodiment of the invention. As a result, there is no need to closely position the electrodes 151 to 153 relative to the optical waveguides 11a, 11b. This can reduce the variation in products and, at the same time, can improve the yield.

Figure 18A:
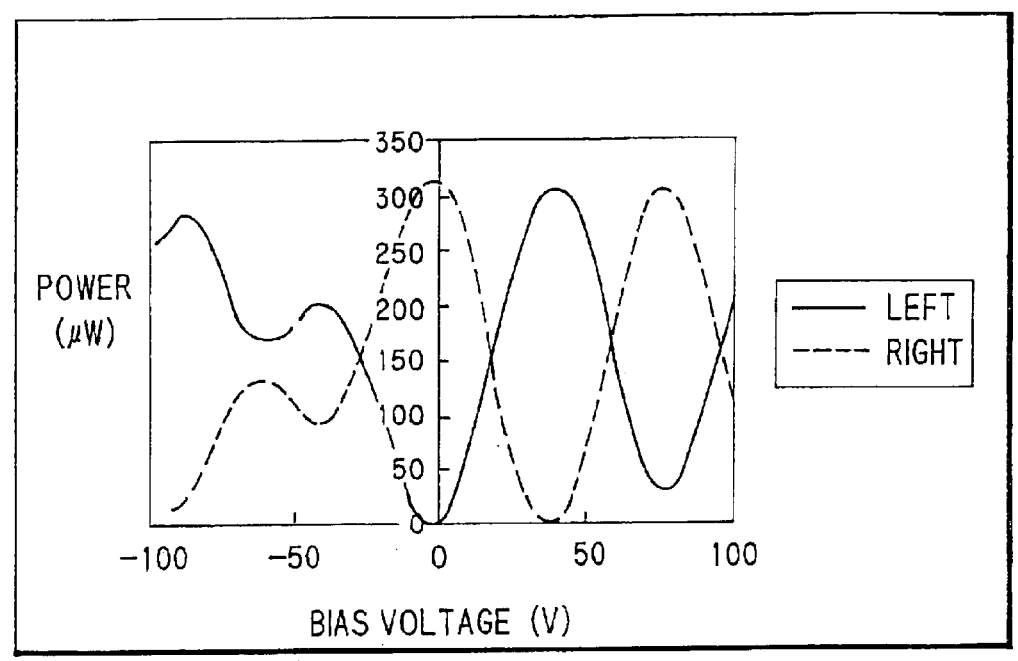
FIGS. 18A and 18B are characteristic diagrams showing extinction ratio characteristics in the waveguide-type optical control device shown in FIG. 14.
Figure 18B:
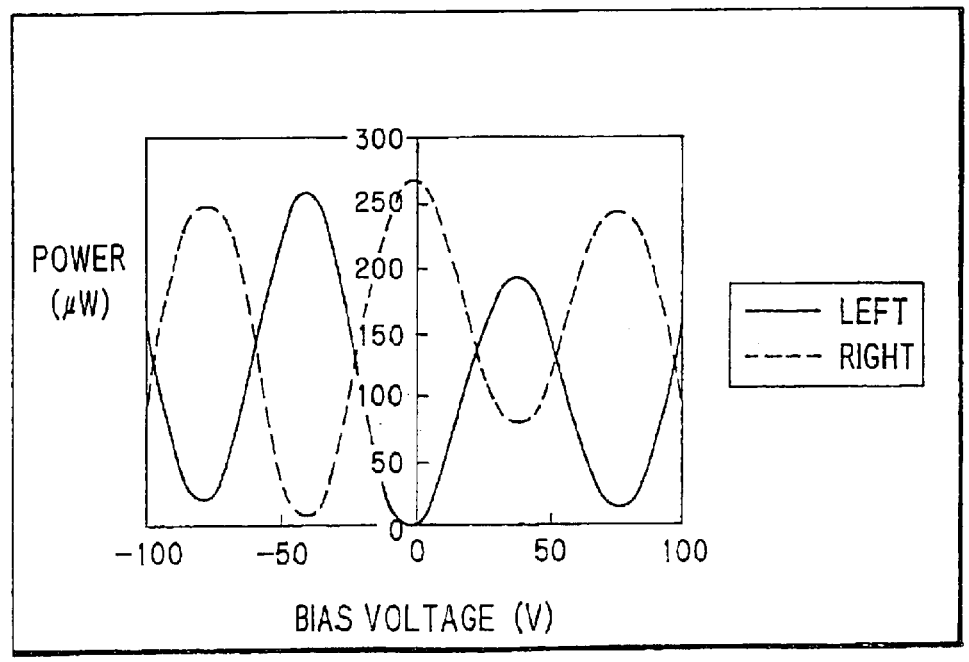

FIGS. 18A and 18B show extinction ratio characteristics in the variable optical attenuator shown in FIG. 17, wherein FIG. 18A represents the case where each electrode has been offset in the right direction and FIG. 18B represents the case where each electrode has been offset in the left direction. Thus, the output state of the optical power can be varied as desired by offsetting the electrodes in either the right direction or the left direction. As is apparent from FIGS. 18A and 18B, a ratio of the minimum attenuation level to the maximum attenuation level (extinction ratio), which is satisfactory for practical use, can be ensured in an actually used region (applied voltage (bias voltage 154)=0 (zero) to about ±50 V). The comparison of the characteristics shown in FIG. 18A with the characteristics shown in FIG. 18B shows that, when the applied voltage is in the range of 0 (zero) to +50 V, the characteristics shown in FIG. 18B are suitable, while, when the applied voltage is in the range of 0 (zero) to −50V, the characteristics shown in FIG. 18B are suitable.

Ninth Preferred Embodiment

Figure 19:
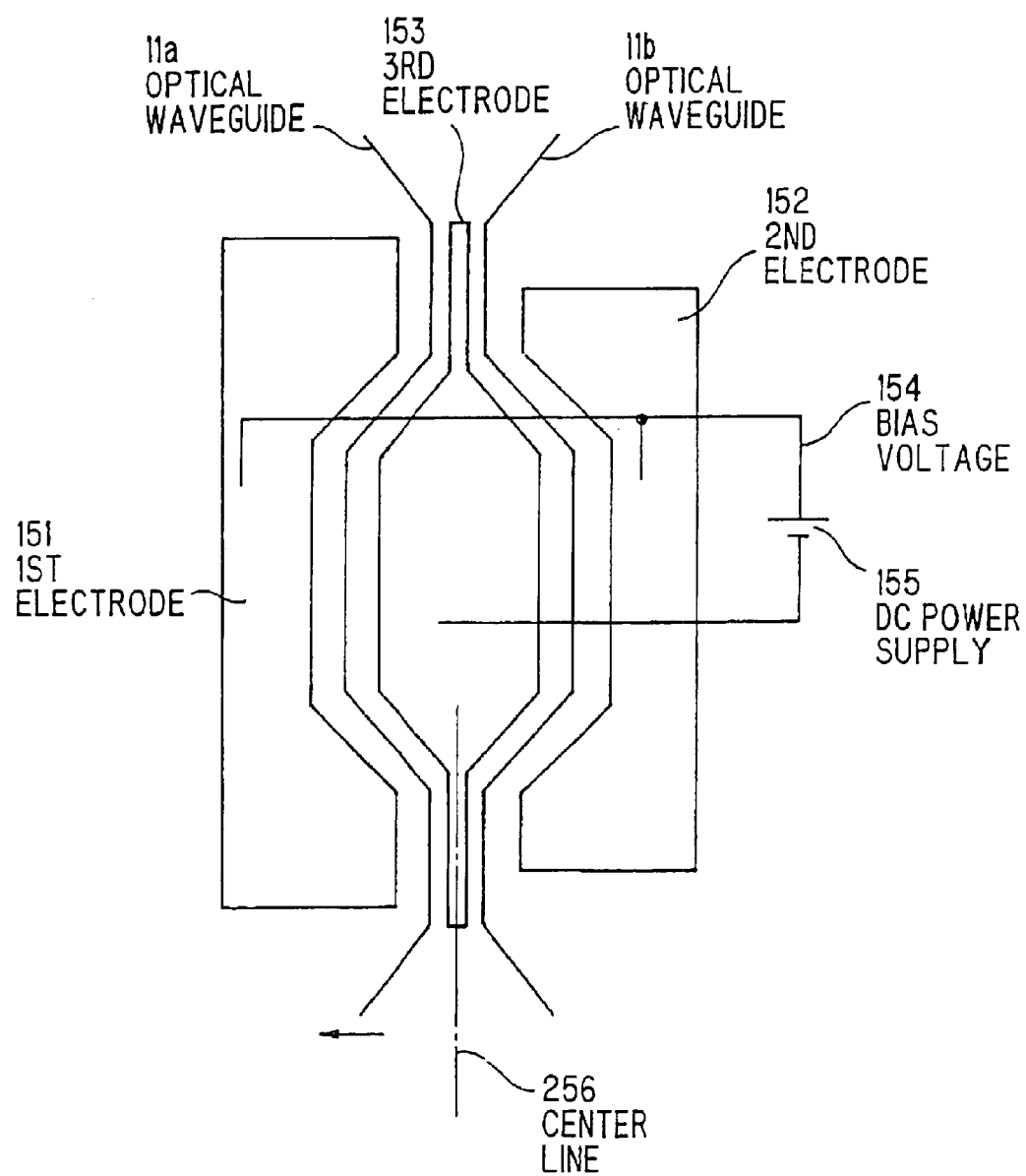
FIG. 19 is a plan view showing the ninth preferred embodiment of the waveguide-type optical control device according to the invention.

FIG. 19 shows the ninth preferred embodiment of the invention.

This preferred embodiment is characterized in that the shape of the first electrode 151 is different from that of the second electrode 152. Specifically, the construction of the ninth preferred embodiment of the invention is such that the first electrode 151 and the second electrode 152 are provided so as to be asymmetrical in terms of length about a center line 256 between the optical waveguides 11a, 11b (the length of the second electrode 152 is smaller than that of the first electrode 151) and a bias voltage 154 is applied across the first and second electrodes 151, 152 and the third electrode 153. In this preferred embodiment, the propagation constant can be changed from βb to βb' by regulating the length of the second electrode 152. By virtue of this, the propagation constant β of the optical waveguide 11a can be made different from that of the optical waveguide 11b. Therefore, in the case of a variable optical attenuator, the optical level attenuation value of the optical waveguide 11a and the optical level attenuation value of the optical waveguide 11b can be controlled so as to be different from each other.

Tenth Preferred Embodiment

Figure 20:
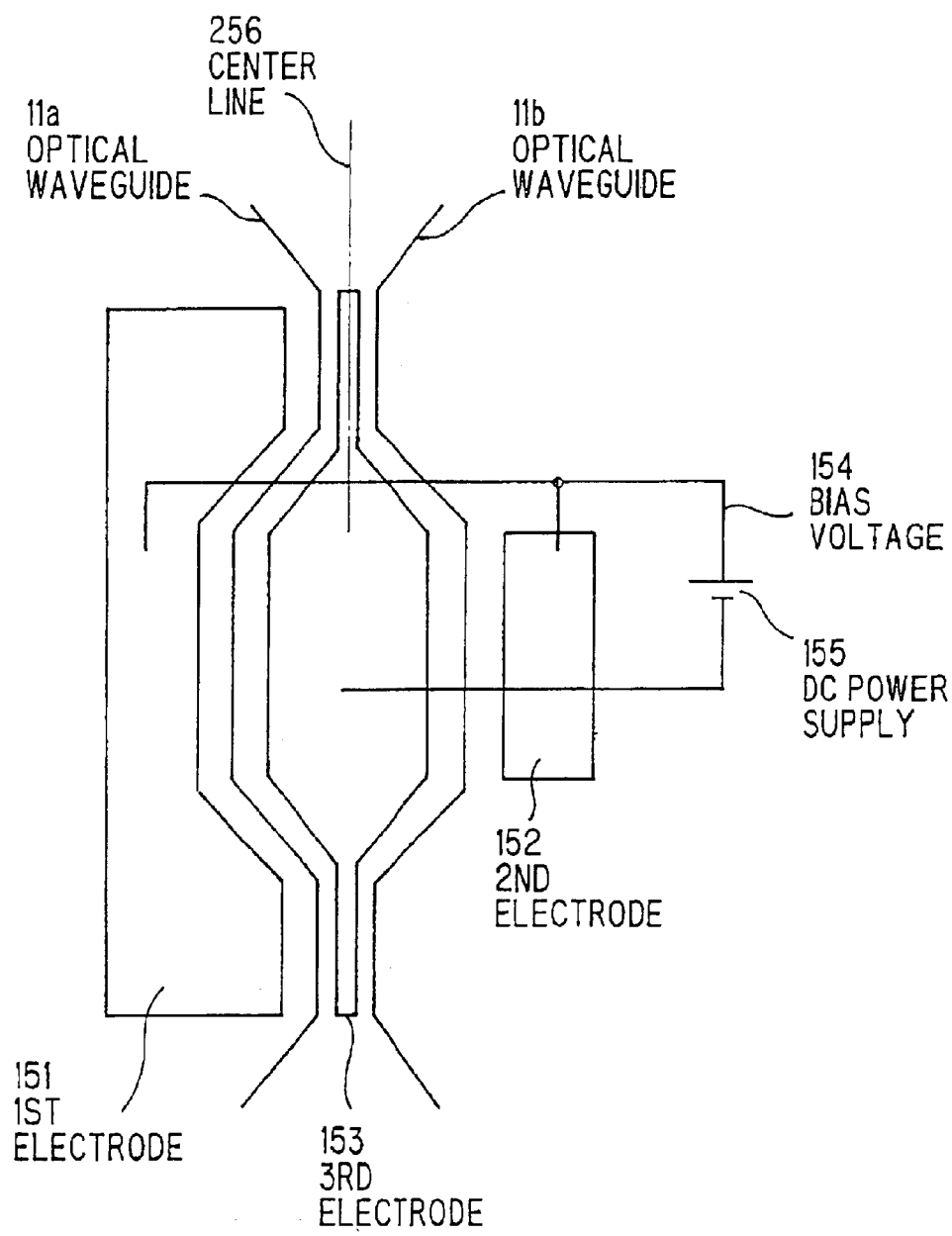
FIG. 20 is a plan view showing the tenth preferred embodiment of the waveguide-type optical control device according to the invention.

FIG. 20 shows the tenth preferred embodiment of the invention.

This preferred embodiment is also characterized in that the shape of the first electrode 151 is different from that of the second electrode 152. Specifically, the length of the second electrode 152 is equal to the length of the straight portion of the optical waveguide 11b in the phase shifter 13, and the whole second electrode 152 is quadrangular. Also in this case, the bias voltage 154 is applied across the first and second electrodes 151, 152 and the third electrode 153.

In the case of the preferred embodiment shown in FIG. 20, the second electrode 152 does not extend to the first directional coupler 12 and the second directional coupler 14 in the optical waveguide 11b. Therefore, with respect to the optical waveguide 11b portion, the arrangement of the electrode is the same as that of the electrode in the optical waveguide 1b in the conventional device shown in FIG. 1. That is, according to this preferred embodiment, the three electrodes 151 to 153 can be made effective only for the optical waveguide 11a, and any electric field is not applied to the optical waveguide 11b in the directional couplers 12, 14. This construction is advantageous when an improvement in the extinction ratio in only one of the optical waveguides 11a and 11b is desired. Further, according to this construction, since the electrode size in any one of the optical waveguides 11a and 11b can be reduced, the area occupied by the waveguide-type optical control device can be reduced.

Eleventh Preferred Embodiment

Figure 21:
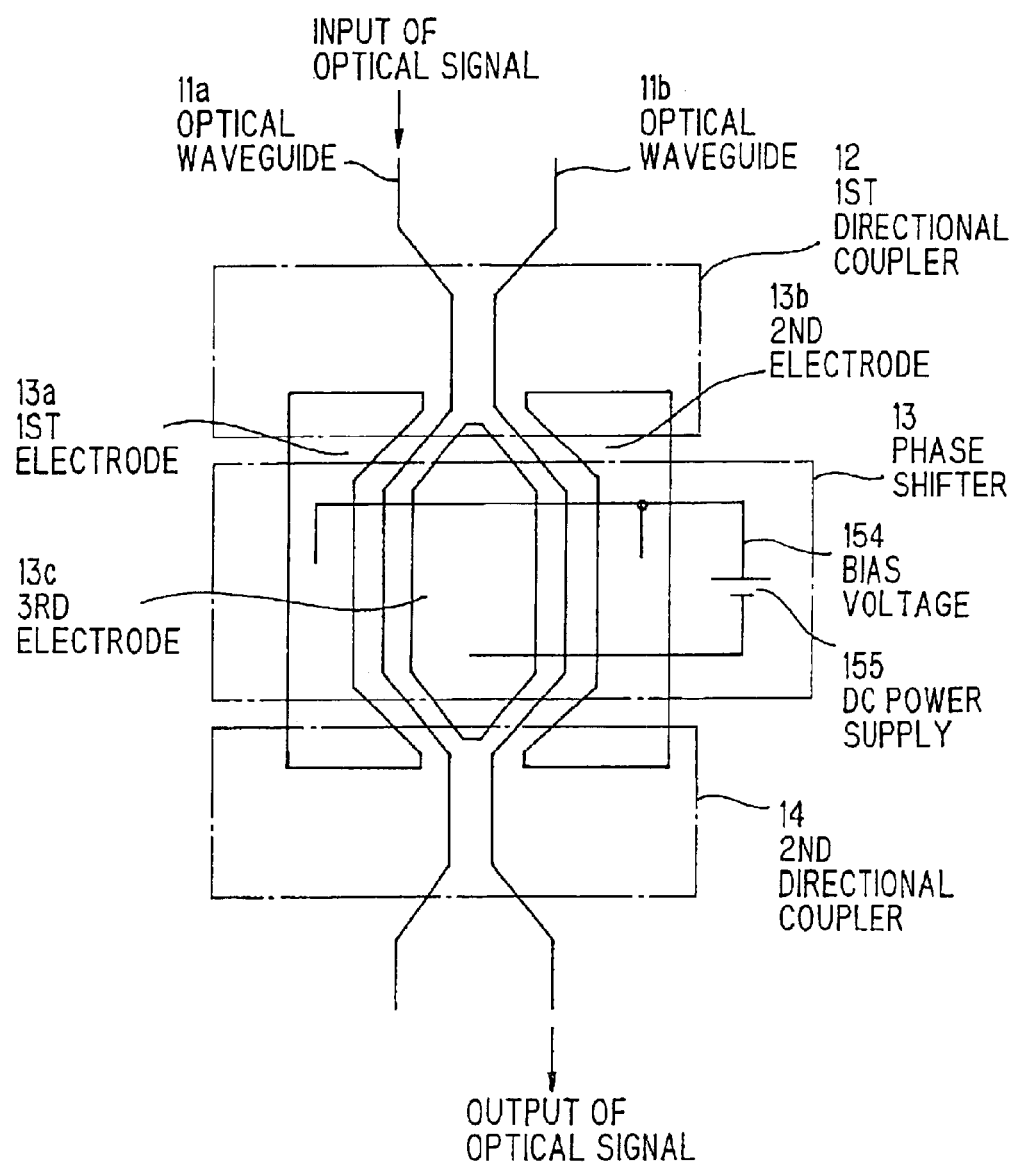
FIG. 21 is a plan view showing the eleventh preferred embodiment of the waveguide-type optical control device according to the invention.

FIG. 21 shows the eleventh preferred embodiment of the invention.

This preferred embodiment is different from the above preferred embodiments in that the length of each electrode is somewhat larger than the length of the phase shifter 13. That is, the end of each electrode is somewhat extended into the first directional coupler 12 and the second directional coupler 14. In this case, the bias voltage 154 is applied by the same manner as used in each of the above preferred embodiments.

According to this preferred embodiment, as compared with the seventh preferred embodiment, the ability to regulate the coupling rate is somewhat inferior. Since, however, the area of the electrode can be reduced, the size of the waveguide-type optical control device can be reduced.

Twelfth Preferred Embodiment

Figure 22:
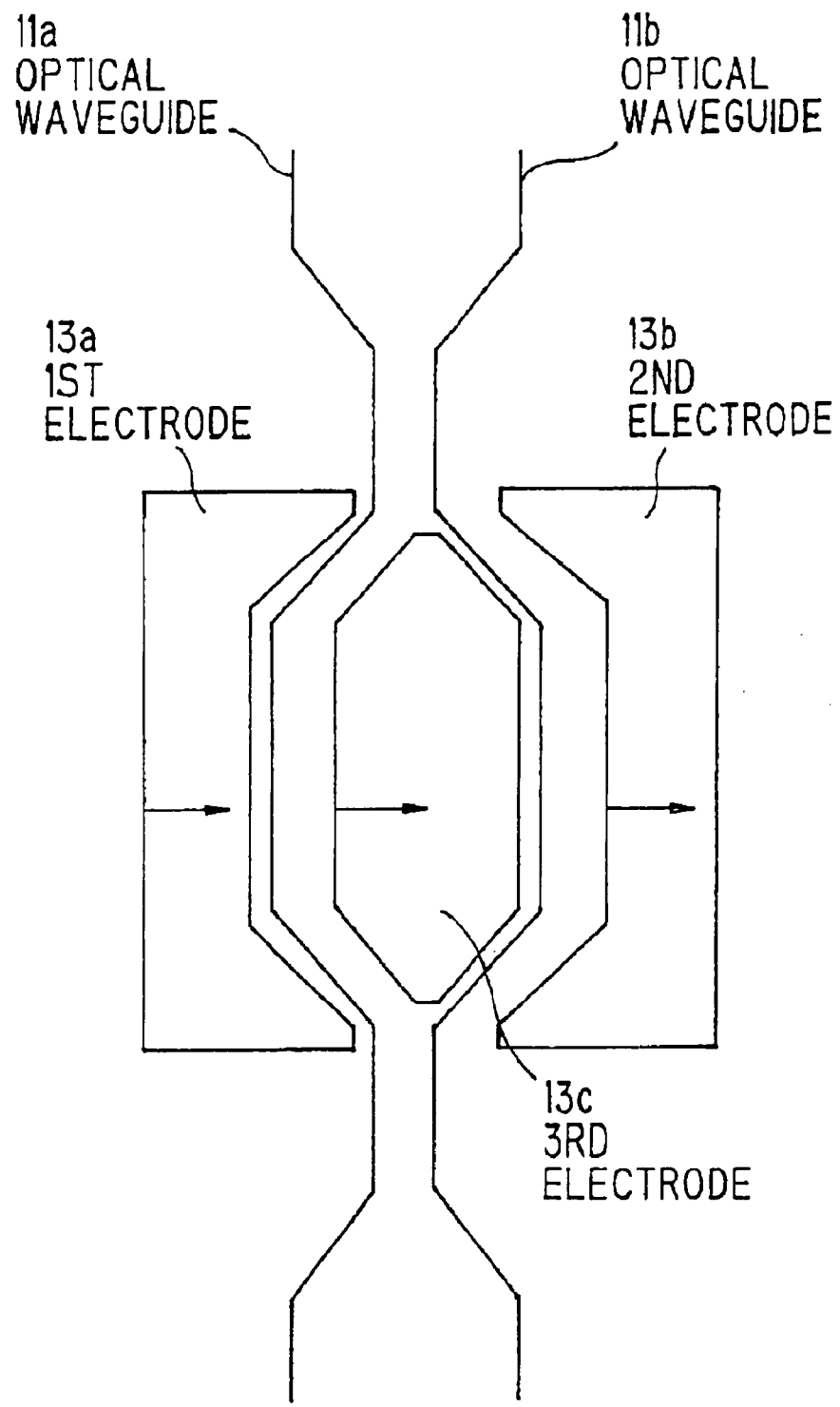
FIG. 22 is a plan view showing the twelfth preferred embodiment of the waveguide-type optical control device according to the invention.

FIG. 22 shows the twelfth preferred embodiment of the invention.

This preferred embodiment is a variant of the preferred embodiment shown in FIG. 21. That is, the construction of the twelfth preferred embodiment is such that the construction shown in FIG. 17 has been added to the construction shown in FIG. 21. More specifically, in the construction of the twelfth preferred embodiment, the first electrode 151, the second electrode 152, and the third electrode 153 have been offset with respect to the center line 256 between the optical waveguides 11a, 11b. In FIG. 22, the first electrode 151, the second electrode 152, and the third electrode 153 have been shifted or offset in the right direction in the drawing. In this preferred embodiment, the bias voltage 154 is applied to each electrode in the same manner as described above in connection with the preferred embodiment shown in FIG. 21. This construction has both the feature of the preferred embodiment shown in FIG. 21 and the feature of the preferred embodiment shown in FIG. 17. Therefore, the freedom of the arrangement of the electrode is high, and, in addition, the area of the electrode can be made small, contributing to a reduction in size of the waveguide-type optical control device.

Figure 23:
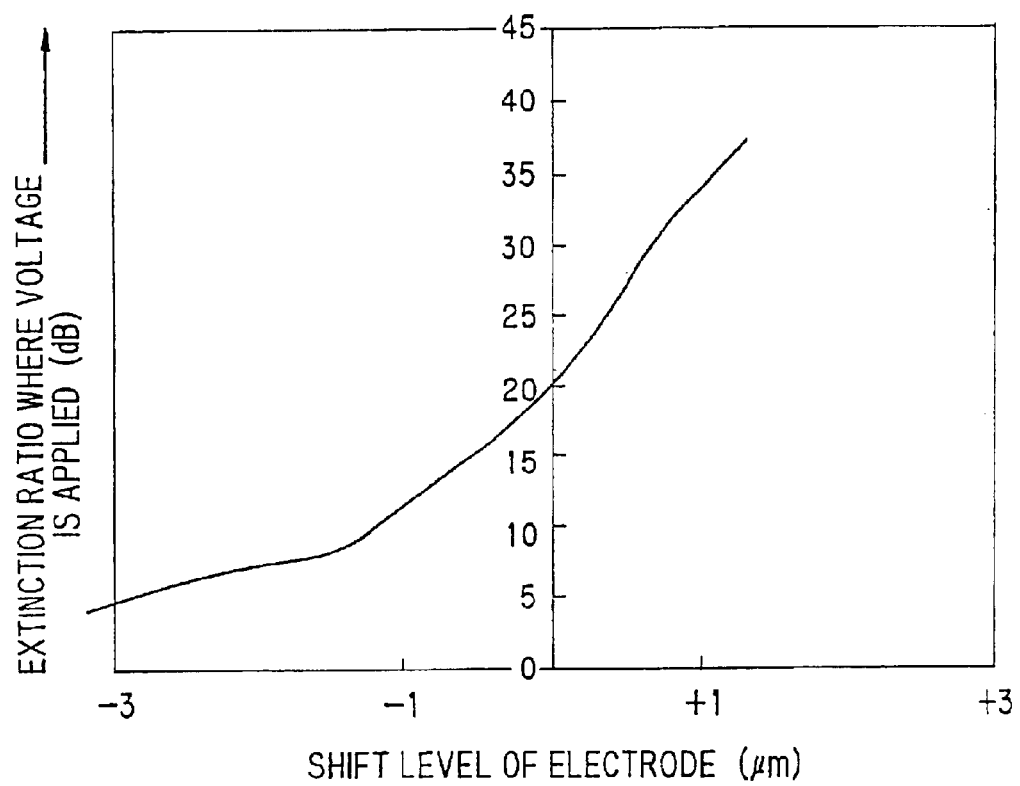
FIG. 23 is a characteristic diagram showing extinction ratio characteristics in the waveguide-type optical control device shown in FIG. 22.

FIG. 23 shows extinction ratio (ratio of the minimum attenuation level to the maximum attenuation level) characteristics in the preferred embodiment shown in FIG. 22 wherein the three electrodes have been simultaneously offset in the right or left direction from the center between the two waveguides. As is apparent from FIG. 23, the obtained ratio of the minimum attenuation level to the maximum attenuation level (extinction ratio) is satisfactory for practical use.

Thirteenth Preferred Embodiment

Figure 24:
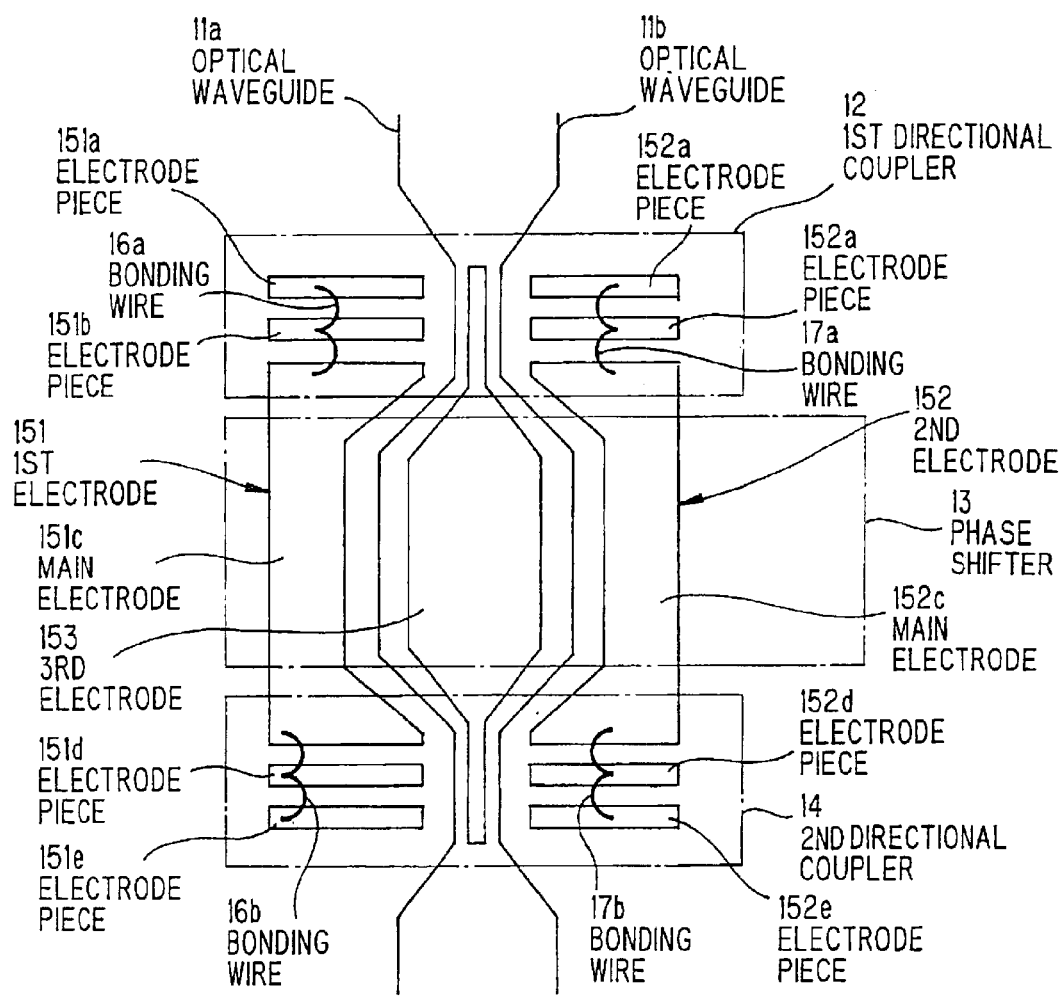
FIG. 24 is a plan view showing the thirteenth preferred embodiment of the waveguide-type optical control device according to the invention.

FIG. 24 shows the thirteenth preferred embodiment of the invention.

The construction of this preferred embodiment is the same as that of the seventh preferred embodiment of the invention shown in FIG. 14, except that both ends of the first electrode 151 are split into a plurality of electrode pieces 151a, 151b, 151e, 151d with the remaining electrode portion serving as a main electrode 151c and, likewise, both ends of the second electrode 152 are split into a plurality of electrode pieces 152a, 152b, 152d, 152e with the remaining electrode portion serving as a main electrode 152c. In each of the directional couplers, the necessary number of electrode pieces are electrically cascaded. In FIG. 24, the main electrode 151c is connected to the electrode pieces 151a, 151b, 151e, 151d in a cascade form by bonding wires 16a, 16b, and the main electrode 152c is connected to the electrode pieces 152a, 152b, 152d, 152e in a cascade form by bonding wires 17a, 17b. This construction can realize fine adjustment of the length of the first electrode 151 and the second electrode 152 in the directional couplers, and, thus, tuning can be carried out so as to provide ideal characteristics.

In the construction shown in FIG. 24, a bonding wire has been used to mutually connect the electrode pieces and to connect the electrode pieces to the main electrode. Alternatively, a construction may be adopted wherein the mutual connection of electrode pieces and the connection of the electrodes to the main electrode are previously performed through a fine wire, which functions as a fuse, and, if necessary, the fuse is fusion cut, for example, by a laser beam to reduce the number of connections of electrode pieces to the necessary number of connections. This fusion cutting is started from the fuse in the outer electrode piece.

Fourteenth Preferred Embodiment

Figure 25:
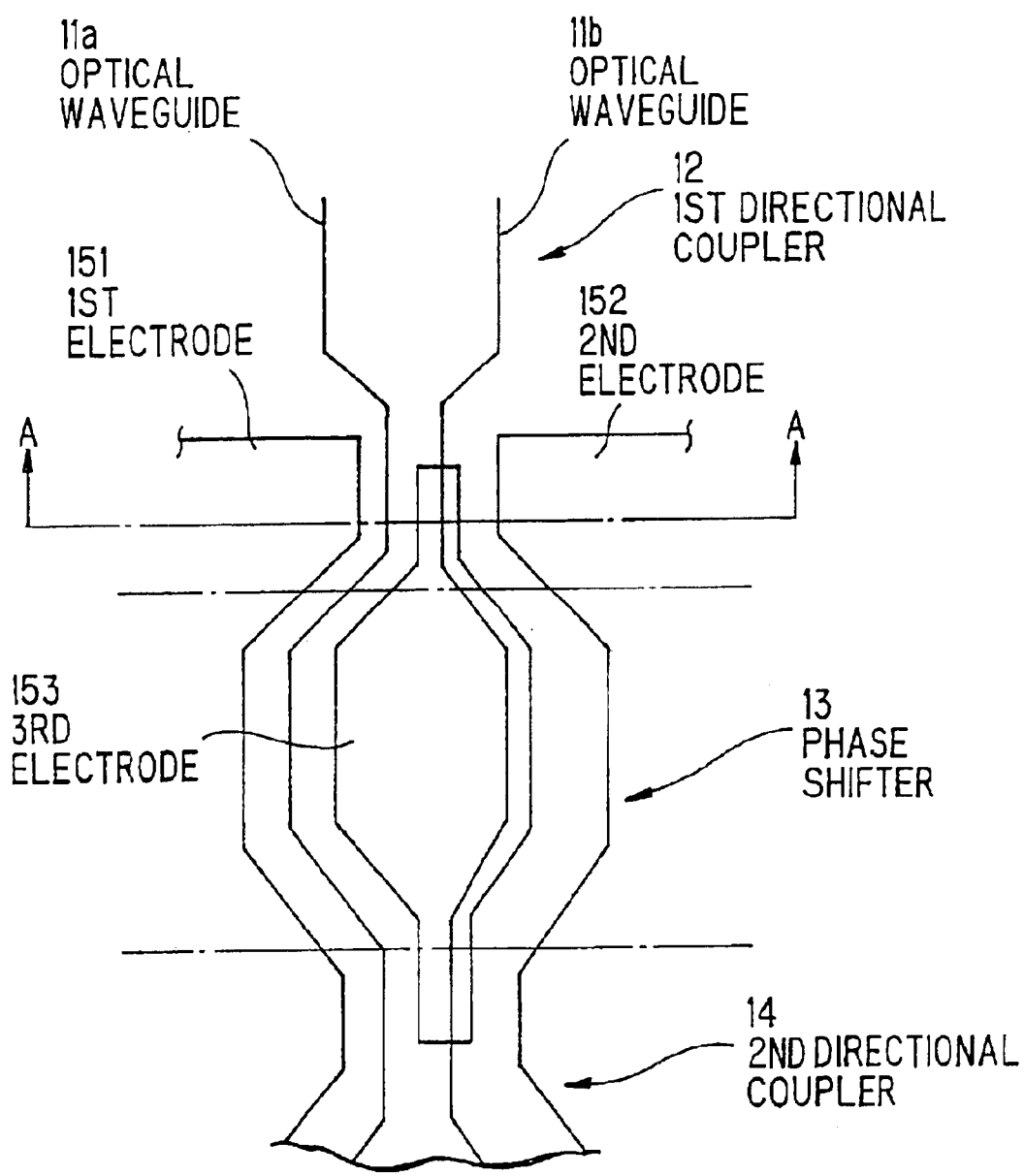
FIG. 25 is a plan view showing the fourteenth preferred embodiment of the waveguide-type optical control device according to the invention.

FIG. 25 shows the fourteenth preferred embodiment of the invention. The construction shown in FIG. 25 is the same as the construction shown in FIG. 14, except that the third electrode 153 is disposed on the optical waveguide 11b and the third electrode 153 and the optical waveguide 11a are partially or entirely overlapped in the thicknesswise direction (vertical direction) so that a longitudinal electric field is applied to the optical waveguide. In this preferred embodiment, the third electrode 153 has been provided on the optical waveguide 11b. Alternatively, the third electrode 153 may be provided on the optical waveguide 11a side. According to the construction shown in FIG. 25, since the distance between the optical waveguide 11b and the third electrode 153 is reduced, the electric field at the time of the application of a voltage can be enhanced and, thus, the sensitivity can be enhanced.

FIGS. 26A to 26D are cross-sectional views taken on line A—A of FIG. 25, illustrating first to fourth embodiments of the structure of the waveguide-type optical control device shown in FIG. 25. In FIGS. 26A to 26D, the cross-section of the first directional coupler 12 is shown. This, however, is true of the second directional coupler 14. FIG. 26A shows the first embodiment of the structure, wherein optical waveguides 11a, 11b are provided near the surface of an $LiNbO_3$ (lithium niobate: LN) substrate 156 and a first electrode 151, a second electrode 152, and a third electrode 153 are then provided on the surface of the $LiNbO_3$ substrate 156 and the optical waveguide 11b. This construction can advantageously reduce the thickness of the directional coupler, but on the other hand, since light is likely to be absorbed, an increase in insertion loss is unavoidable.

FIG. 26B shows the second embodiment of the structure. In this structure, optical waveguides 11a, 11b are provided near the surface of an $LiNbO_3$ substrate 156, and a buffer layer 157 formed of a dielectric film (oxide film: $SiO_2$, ITO: indium tin oxide or the like) or a semiconductor film (Si or the like) is then provided on the surface of the $LiNbO_3$ substrate 156 and the optical waveguide 11b. Further, a first electrode 151, a second electrode 152, and a third electrode 153 are provided on the surface of the buffer layer 157 so that the arrangement is as shown in FIG. 25 as viewed from above. By virtue of the provision of the buffer layer 157, as compared with the structure shown in FIG. 26A, the structure shown in FIG. 26B can suppress the absorption of light, and, thus, the insertion loss can be reduced.

FIG. 26C shows the third embodiment of the structure, wherein optical waveguides 11a, 11b are provided near the surface of the $LiNbO_3$ substrate 156 and a first electrode 151, a second electrode 152, and a third electrode 153 are provided on the backside of the $LiNbO_3$ substrate 156. In this case, the three electrodes are provided at respective positions on which the arrangement of the electrodes in the second embodiment of the structure has been reflected. In this structure, the spacing (distance) between the optical waveguides 11a, 11b and each electrode, that is, the sensitivity or the like, can be freely set according to the thickness of the $LiNbO_3$ substrate 156.

FIG. 26D shows the fourth embodiment of the structure. In this structure, optical waveguides 11a, 11b are provided at respective predetermined positions near the surface of the $LiNbO_3$ substrate 156, and grooves 158 are then provided, for example, by etching at sites where a first electrode 151, a second electrode 152, and a third electrode 153 are to be provided. In this case, since the third electrode 153 cannot be embedded in the optical waveguide 11b, the groove for the third electrode 153 is provided at a site adjacent to the optical waveguide 11b. The first electrode 151, the second electrode 152, and the third electrode 153 are provided within the grooves 158. In this construction, each electrode is formed so as to be coplanar with the optical waveguides 11a, 11b. In the production of the device, a method may be adopted which comprises the steps of: first forming the grooves 158; provided each electrode; and then providing the optical waveguides 11a, 11b. Alternatively, a method may be adopted which comprises the steps of: first providing the grooves 158; providing the optical waveguides 11a, 11b; and then providing the electrodes.

The above-described four embodiments of the structure shown in FIGS. 26A to 26D are different from one another, for example, in only the position, arrangement, or shape of the electrodes, and these structures can also be applied to the above other preferred embodiments.

Fifteenth Preferred Embodiment

FIG. 27 shows the construction of an optical equalizer using the waveguide-type optical control device according to the invention.

This optical equalizer is provided at a position between both ends of an optical transmission line, and comprises: a demultiplexer 1101 as an optical demultiplexer for demultiplexing an input light into a plurality of optical signals with different wavelengths; a plurality of variable optical attenuators 1100 for regulating the attenuation level of each output light for matching the level; a multiplexer 1102 as an optical multiplexer for multiplexing optical signals respectively from the variable optical attenuators 1100; and an attenuation level control circuit 1110 for controlling the attenuation level of the variable optical attenuator 1100. The waveguide-type optical control devices according to the above preferred embodiments are used as the variable optical attenuator 1100. The optical waveguide 11a shown in FIG. 14 is connected to the demultiplexer 1101, and the optical waveguide 11b is connected to the multiplexer 1102. The direct current power supply shown in FIG. 14 and a voltage varying circuit for varying the output voltage thereof are provided in the attenuation level control circuit 1110. The attenuation levels of the optical signals demultiplexed by the demultiplexer 1101 can be matched by regulating the attenuation levels of the optical signals through the variable optical attenuator 1100 and the attenuation level control circuit 1110. As described above, in the waveguide-type optical control device (variable optical attenuator 1100) according to the invention, the size can be reduced. Therefore, in the construction shown in FIG. 27, the combination of the device with the demultiplexer 1101 and the multiplexer 1102 does not increase the size of the optical equalizer.

Further, the attenuation level control circuit 1110 can perform control in such a manner that the levels of the optical signals to be output respectively from the variable optical attenuators 1100 provide a preset level difference. The wavelength dependency of the gain of the optical amplifier and the wavelength dependency of the transmission line loss can be improved, for example, by presetting the optical level difference by taking into consideration the wavelength dependency of the gain of the optical amplifier and the wavelength dependency of the transmission line loss.

Sixteenth Preferred Embodiment

FIG. 28 shows the construction of an optical inserting/separating apparatus to which the waveguide-type optical control device according to the invention has been applied.

This optical inserting/separating apparatus is provided at a position between both ends of an optical transmission line which has been laid by a certain distance. Multiplexed optical signal to be input into a demultiplexer 1101 as an optical demultiplexer is amplified by an optical amplifier (not shown), and is then demultiplexed by a demultiplexer 1101 into a plurality of signals. Each of the demultiplexed signals is dropped (i.e., is removed to the exterior) or is sent to the output side without drop according to switching of a 1×2 optical switch 1103. For the optical signal sent to the output side, the optical attenuation level is regulated by the variable optical attenuator 1100 and the attenuation level control circuit 1110 to render the output levels for the respective channels uniform. The waveguide-type optical control device described in each preferred embodiment may be used in the variable optical attenuator 1100. The optical signals respectively from the variable optical attenuators 1100 are multiplexed by a multiplexer 1102 as an optical multiplexer into a multiplexed light which is then output to the optical transmission line. When the 2×1 optical switch 1104 has been switched to the Add side, the optical information, which has been introduced through the Add end, is input into a 2×1 optical switch 1104 and is added to the multiplexed optical signal received from the demultiplexer 1101. Also in this optical inserting/separating apparatus, the use of the waveguide-type optical control device in the variable optical attenuator 1100 can reduce the size of the apparatus. Therefore, the combination of the device with the demultiplexer 1101 and the multiplexer 1102 does not increase the size of the apparatus.

Seventeenth Preferred Embodiment

Figure 29:
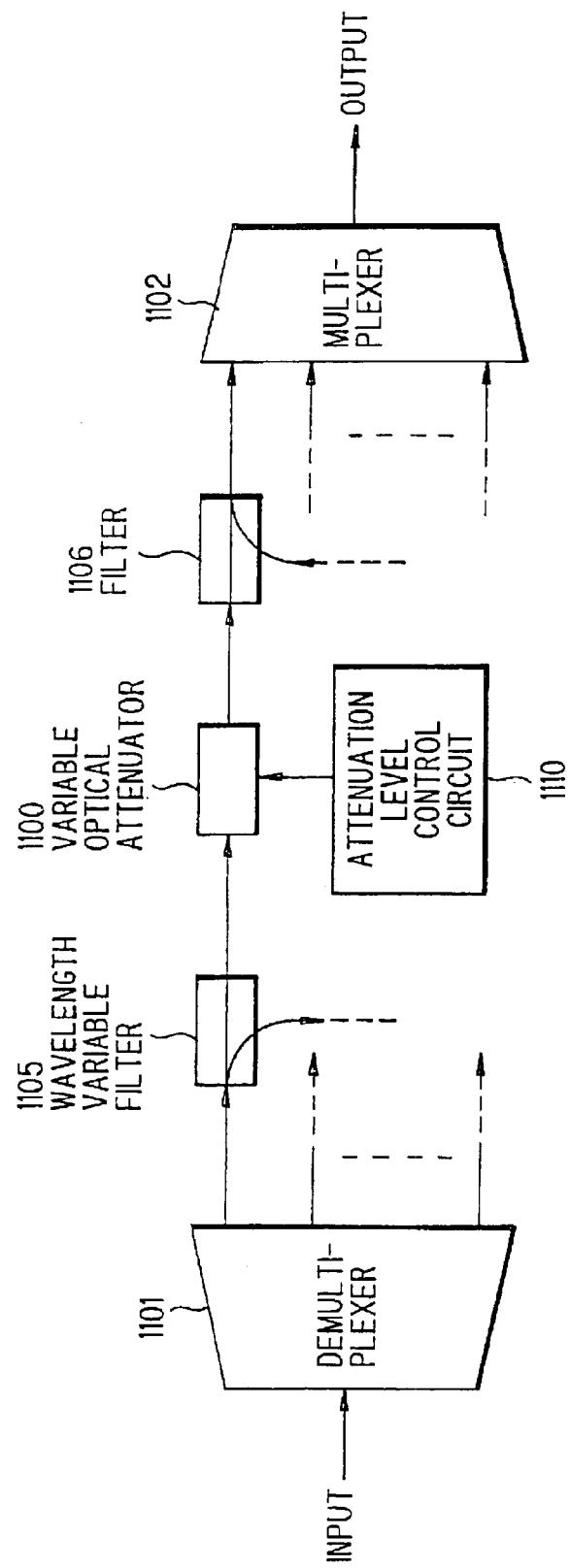
FIG. 29 is a block diagram showing another construction of an optical inserting/separating apparatus to which the waveguide-type optical control device according to the invention has been applied.

FIG. 29 shows another construction of the optical inserting/separating apparatus to which the waveguide-type optical control device according to the invention has been applied.

The construction of this optical inserting/separating apparatus shown in FIG. 29 is the same as that of the optical inserting/separating apparatus shown in FIG. 28, except that a wavelength varying filter 1105 is provided instead of the 1×2 optical switch 1103 as the optical demultiplexer and a filer 1106 is provided instead of the 2×1 optical switch 1104 as the optical multiplexer. The wavelength varying filter 1105 functions to selectively separate an optical signal with a predetermined wavelength from optical signals demultiplexed by the demultiplexer 1101. For the output light from the wavelength varying filter 1105, predetermined attenuation is carried out by the variable optical attenuator 1100 and the attenuation level control circuit 1110. Further, an optical signal output from the variable light attenuator 1100 or an externally inserted optical signal is selected by the filter 1106 and is input into the multiplexer 1102. The multiplexer 1102 adds an optical signal output from other filter 1106 to this input optical signal, and the multiplexed optical signal is then output. Also in this optical inserting/separating apparatus, the use of the waveguide-type optical control device in the variable optical attenuator 1100 can reduce the size of the apparatus. Therefore, the combination of the device with the wavelength varying filter 1105 and the filter 1106 does not increase the size of the apparatus. Thus, a reduction in size and a reduction in weight can be realized.

Also in this construction, the attenuation level control circuit 1110 can perform control in such a manner that the levels of the optical signals to be output respectively from the variable optical attenuators 1100 provide a preset level difference. The wavelength dependency of the gain of the optical amplifier and the wavelength dependency of the transmission line loss can be improved, for example, by presetting the optical level difference by taking into consideration the wavelength dependency of the gain of the optical amplifier and the wavelength dependency of the transmission line loss.

In the electrode construction according to the second and third preferred embodiments of the invention, the shape of the second electrode 52 has been made different from the shape of the second electrode 52 in the first preferred embodiment of the invention. Alternatively, the shape of the first electrode 51 may be made different from the electrode construction according to the first preferred embodiment of the invention.

Likewise, in the electrode construction according to the eighth and ninth preferred embodiments of the invention, the shape of the second electrode 152 has been made different from the shape of the second electrode 152 in the seventh preferred embodiment of the invention. Alternatively, the shape of the first electrode 151 may be made different from the electrode construction according to the seventh preferred embodiment of the invention. Further, in connection with the constructions shown in FIGS. 27 to 29, a combination of constructions shown in FIGS. 27 to 29 may be adopted. Further, among the three constructions shown in FIGS. 27 to 29, two or all constructions may be adopted. In FIGS. 27 to 29, all the variable optical attenuators connected to the demultiplexer 1101 are not always required to have an identical construction, and a variation of the above-described waveguide-type optical control devices may be present.

In each of the above preferred embodiments, a variable optical attenuator has been used as the waveguide-type optical control device. However, it should be noted that the invention is not limited to the variable optical attenuator and can be applied to all of waveguide-type optical control devices for controlling light, which passes through the optical waveguide, according to the voltage applied to the electrode. The invention can also be applied, for example, to optical switches and optical intensity modulators which have been constructed with optical waveguides.

Further, in the above preferred embodiments, a directional coupler has been provided in each of the optical branching section provided on the input side of the phase shifting section and the optical coupling section provided on the output side. Alternatively, the directional coupler may be provided in any one of the optical branching section and the optical coupling section. For example, a Y branching device may be used on the input side or the output side in which the directional coupler has not been used. Specific examples thereof include: a one-input two-output construction wherein a Y branching device is used in the optical branching section while the directional, coupler according to the invention is used in the optical coupling section; and a two-input one-output construction wherein the directional coupler according to the invention is used in the optical branching section while a Y branching device is used in the optical coupling section. In any of these constructions, the problem of the production accuracy (yield) involved in the directional coupler can be reduced. Thus, the necessary number of directional couplers can be advantageously reduced.

As described above, in the waveguide-type optical control device according to the first feature of the invention, the first, second, and third electrodes are extended from the control unit into the first and second directional couplers so that the voltage applied to the phase shifter as such is also applied to the first and second directional couplers. By virtue of this construction, the coupling length can be equivalently regulated to reduce a deterioration in extinction ratio. Further, since the number of electrodes in the directional coupler is identical to that in the phase shifter, the size of the device is not increased. Therefore, the size of the waveguide-type optical control device can be reduced, and, in addition, the complication of the control system can be avoided, contributing to simplified control.

In the waveguide-type optical control device according to the second feature of the invention, the voltage applied to the electrode section in the phase shifting section is simultaneously applied to the electrodes in the electrode portion in at least one directional coupler. By virtue of this construction, the refractive index in the directional coupler can be controlled without the need to separately provide a control system for the directional coupler, and the coupling length L can be equivalently regulated to reduce a deterioration in extinction ratio. Since the number of electrodes in the directional coupler is identical to that in the phase shifter, the size of the device is not increased. Therefore, the size of the waveguide-type optical control device can be reduced, and, in addition, the complication of the control system can be avoided, contributing to simplified control.

In the variable optical attenuator according to the invention, the directional coupler comprises a second electrode section having three electrodes, i.e., a first electrode provided on the left side of the left optical waveguide, a second electrode provided on the right side of the right optical waveguide, and a third electrode provided between the two optical waveguides, and the electrodes in this electrode section are separately and electrically connected respectively to three electrodes of the first electrode section in the phase shifter, whereby the voltage applied to the first electrode section in the phase shifter is simultaneously applied to the electrodes of the second electrode section in the directional coupler. By virtue of this construction, the refractive index in the directional coupler is controlled by the voltage applied to the phase shifter to control the attenuation level of optical signals which pass through the optical waveguides. This can realize a reduction in size of the variable optical attenuator, and the complication of the control system (attenuation level control circuit) can be avoided.

Further, in the optical equalizer and the optical inserting/separating apparatus according to the invention, a variable optical attenuator, which has been constructed so as to apply a control voltage for common use in the electrode sections of the phase shifter and the directional couplers, is provided between the optical demultiplexer and the optical multiplexer so that the variable optical attenuator can control the optical attenuation level to match the levels of the demultiplexed optical signals. By virtue of this construction, the size of the variable optical attenuator can be reduced, and the necessity of increasing the size of the optical equalizer or the optical inserting/separating apparatus can be eliminated.

According to the waveguide-type optical control device according to the invention, the first, second, and third electrodes in the phase shifter are extended into a part or the whole of the first directional coupler or the second directional coupler using common optical waveguides, and, at the same time, the extended portion of the third electrode in the directional coupler is provided so that a longitudinal electric field is applied to one of the optical waveguides. Therefore, an electric field for controlling the refractive index is applied, by the voltage applied to the electrodes in the phase shifter, from the vertical direction (thicknesswise direction of the electrode) to the first or second directional coupler, and, in the case of an identical voltage, a strong electric field can be applied while, in the case of an identical electric field, the applied voltage can be lowered. Further, since the coupling length L is equivalently regulated, a deterioration in extinction ratio can be reduced. Further, since insulation between the electrodes in the phase shifter and the electrodes in the directional coupler is not required, there is no need to provide a space between these electrodes. This can eliminate the need to increase the size of the waveguide-type optical control device, and, in addition, the complication of the control system can be avoided.

In the production process of a waveguide-type optical control device according to the invention, after a phase shifter and directional couplers are formed by two optical waveguides, the first, second, and third electrodes are formed respectively in predetermined regions of the phase shifter and the directional couplers. In the directional couplers, a plurality of electrode pieces are connected in a cascade form to the end of the first electrode and the end of the second electrode through a fuse or a bonding wire. By virtue of this construction, the electric field forming region can be varied by finely adjusting the length of the first electrode and the length of the second electrode. As a result, tuning can be performed to provide ideal characteristics.

The invention has been described in detail with particular reference to preferred embodiments, but it will be understood that variations and modifications can be effected within the scope of the invention as set forth in the appended claims.

What is claimed is:

1. A variable optical attenuator comprising:
 a phase shifter provided with a first electrode section comprising an electrode provided on the left side of a left optical waveguide, an electrode provided on the right side of a right optical waveguide, and an electrode provided between the two optical waveguides; and
 a directional coupler comprising two optical waveguides which are connected respectively to the two optical waveguides in the phase shifter and are provided parallel to each other with the spacing between the two optical waveguides being partially reduced, said directional coupler being used in at least one of an optical branching section provided on the input side of the phase shifter and an optical coupling section provided on the output side of the phase shifter, the refractive index of the two optical waveguides being varied according to a voltage applied across the electrodes provided respectively on the left side of the left optical waveguide and the right side of the right optical waveguide and the electrode provided between the two optical waveguides in the phase shifter, whereby the attenuation level of the lights passed through the optical waveguides is controlled;
 said directional coupler being provided with a second electrode section comprising an electrode provided on the left side of the left optical waveguide, an electrode provided on the right side of the right optical waveguide, and an electrode provided between the two optical waveguides, the three electrodes constituting the second electrode section being electrically connected respectively to the three electrodes constituting the first electrode section provided adjacent to the second electrode section in the longitudinal direction of the two optical waveguides, the voltage applied to the first electrode section being applied to the second electrode section.

2. An optical equalizer comprising:
 an optical demultiplexer into which a wavelength multiplexed optical signal containing a plurality of optical signals with one or mutually different wavelengths is input and which demultiplexes the wavelength multiplexed optical signal into optical signals and outputs the demultiplexed optical signals;

the variable optical attenuator according to claim 1 which selectively attenuates the demultiplexed optical signals by a predetermined attenuation level and outputs the attenuated optical signals; and an optical multiplexer for multiplexing the attenuated optical signals output from the variable optical attenuator.

3. The optical equalizer according to claim 2, which further comprises an attenuation level control circuit for controlling the variable optical attenuator so as to render the optical levels of the attenuated optical signals homogeneous.

4. The optical equalizer according to claim 2, which further comprises an attenuation level control circuit for controlling the variable optical attenuator in such a manner that a predetermined difference is provided between the optical levels of the attenuated optical signals.

5. An optical inserting/separating apparatus comprising:

an optical demultiplexer into which a wavelength multiplexed optical signal containing a plurality of optical signals with one or mutually different wavelengths is input and which demultiplexes the wavelength multiplexed optical signal into optical signals and outputs the demultiplexed optical signals;

a wavelength varying filter for selectively separating an optical signals with predetermined wavelengths from the demultiplexed optical signals;

the variable optical attenuator according to claim 1 which selectively attenuates the demultiplexed optical signals, which have passed through the wavelength varying filter, by a predetermined attenuation level and outputs the attenuated optical signals; and a filter which selects and outputs the attenuated optical signals from the variable optical attenuator or externally inserted optical signals; and an optical multiplexer for multiplexing the attenuated optical signals output from the filter or the inserted optical signals.

6. The optical inserting/separating apparatus according to claim 5, which further comprises an attenuation level control circuit for controlling the variable optical attenuator so as to render the optical levels of the attenuated optical signals and the inserted optical signals homogeneous.

7. The optical inserting/separating apparatus according to claim 5, which further comprises an attenuation level control circuit for controlling the variable optical attenuator so as to provide a predetermined difference between the optical levels of the attenuated optical signals and the inserted optical signals.

* * * * *